(12) United States Patent
Freedman et al.

(10) Patent No.: US 12,465,788 B2
(45) Date of Patent: Nov. 11, 2025

(54) MRI-BASED MOTION MONITORING AND GATING FOR RADIOTHERAPY

(71) Applicant: Elekta Limited, Crawley (GB)

(72) Inventors: Joshua Freedman, Crawley (GB); Fabienne Lathuiliere, Outremont (CA); Martin Emile Lachaine, Montreal (CA); David Roberts, Crawley (GB)

(73) Assignee: Elekta Limited, Crawley (GB)

( * ) Notice: Subject to any disclaimer, the term of this patent is extended or adjusted under 35 U.S.C. 154(b) by 203 days.

(21) Appl. No.: 18/473,656

(22) Filed: Sep. 25, 2023

(65) Prior Publication Data
US 2025/0099783 A1    Mar. 27, 2025

(30) Foreign Application Priority Data

Sep. 28, 2022    (GB) .................................... 2214228

(51) Int. Cl.
*A61N 5/10*    (2006.01)
*G06T 5/80*    (2024.01)
(Continued)

(52) U.S. Cl.
CPC .............. *A61N 5/1068* (2013.01); *A61N 5/10* (2013.01); *A61N 5/1037* (2013.01);
(Continued)

(58) Field of Classification Search
CPC ........ A61N 5/10; A61N 5/103; A61N 5/1031; A61N 5/1037; A61N 5/1039; A61N 5/1042; A61N 5/1043; A61N 5/1045; A61N 5/1047; A61N 5/1048; A61N 5/1049; A61N 2005/1052; A61N 2005/1054; A61N 2005/1055; A61N 2005/1061; A61N 2005/1062; A61N 5/1064; A61N 5/1065;
(Continued)

(56) References Cited

U.S. PATENT DOCUMENTS 6,415,171 B1 *    7/2002    Gueziec ................. A61B 6/463
                                                       600/407
7,772,843 B2 *    8/2010    Hebrank .......... G01R 33/56518
                                                       324/309
(Continued)

FOREIGN PATENT DOCUMENTS

EP          4113147 A1       1/2023

OTHER PUBLICATIONS

"United Kingdom Application Serial No. 2214228.5, Examination Report dated Mar. 14, 2023" (Mar. 14, 2023), 6 pgs.
(Continued)

*Primary Examiner* — Allen C. Ho
(74) *Attorney, Agent, or Firm* — Schwegman Lundberg & Woessner, P.A.

(57) ABSTRACT

There are provided systems, methods and radiotherapy devices for monitoring the position of a subject during radiotherapy, which comprise obtaining an MR image slice of a subject that exhibits through-plane distortion, obtaining a pre-treatment image slice of the subject that corresponds to the MR image slice and exhibits through-plane distortion that corresponds to the through-plane distortion of the MR image slice, and comparing the MR image slice with the corresponding pre-treatment image slice.

22 Claims, 13 Drawing Sheets

(51) Int. Cl.
    *G06T 7/13* (2017.01)
    *G06T 7/73* (2017.01)
    *G16H 20/40* (2018.01)
    *G16H 30/40* (2018.01)

(52) U.S. Cl.
    CPC ......... *A61N 5/1039* (2013.01); *A61N 5/1049* (2013.01); *A61N 5/1067* (2013.01); *A61N 5/1081* (2013.01); *G06T 5/80* (2024.01); *G06T 7/13* (2017.01); *G06T 7/74* (2017.01); *G16H 20/40* (2018.01); *G16H 30/40* (2018.01); *A61N 2005/1055* (2013.01); *A61N 2005/1074* (2013.01); *A61N 2005/1089* (2013.01); *G06T 2200/04* (2013.01); *G06T 2207/10088* (2013.01); *G06T 2207/30004* (2013.01)

(58) Field of Classification Search
    CPC .. A61N 5/1067; A61N 5/1068; A61N 5/1071; A61N 2005/1072; A61N 2005/1074; A61N 5/1081; A61N 2005/1089
    USPC .......................................................... 378/65
    See application file for complete search history.

(56) References Cited

U.S. PATENT DOCUMENTS

| | | | | |
|---|---|---|---|---|
| 9,468,777 | B2* | 10/2016 | Fallone | A61N 5/1049 |
| 9,652,871 | B2* | 5/2017 | Han | G06T 11/003 |
| 9,878,177 | B2* | 1/2018 | Han | G06T 7/246 |
| 10,029,121 | B2* | 7/2018 | Li | A61B 5/055 |
| 10,327,666 | B2* | 6/2019 | Lachaine | G01R 33/5608 |
| 10,342,996 | B2* | 7/2019 | Jordan | A61N 5/1039 |
| 10,350,438 | B2* | 7/2019 | Brooks | G06N 20/00 |
| 10,525,284 | B2* | 1/2020 | Lachaine | A61N 5/1039 |
| 10,532,224 | B2* | 1/2020 | Jordan | A61N 5/1039 |
| 10,596,393 | B2* | 3/2020 | Stanescu | A61N 5/1049 |
| 10,748,296 | B2* | 8/2020 | Magro | A61N 5/1039 |
| 10,806,947 | B2* | 10/2020 | Foo | A61B 5/055 |
| 10,864,383 | B2* | 12/2020 | Wu | A61N 5/1068 |
| 10,888,714 | B2* | 1/2021 | Dempsey | A61N 5/107 |
| 11,040,221 | B2* | 6/2021 | Lachaine | A61N 5/1067 |
| 11,064,899 | B2* | 7/2021 | Lachaine | A61N 5/1045 |
| 11,103,729 | B2* | 8/2021 | Lachaine | A61N 5/1067 |
| 11,141,609 | B2* | 10/2021 | Tilly | A61N 5/1067 |
| 11,707,235 | B2* | 7/2023 | Hu | G01S 13/34 600/413 |
| 11,878,188 | B2* | 1/2024 | Gach | A61N 5/1049 |
| 11,951,331 | B2* | 4/2024 | Torres | A61N 5/1067 |
| 11,961,245 | B2* | 4/2024 | Wang | A61N 5/1049 |
| 12,005,271 | B2* | 6/2024 | Kim | A61N 5/1049 |
| 12,042,669 | B2* | 7/2024 | Hu | A61N 5/1068 |
| 12,064,648 | B2* | 8/2024 | Falco | A61N 5/1045 |
| 12,115,392 | B2* | 10/2024 | Brown | A61N 5/1049 |
| 12,157,014 | B2* | 12/2024 | Ni | A61N 5/1067 |
| 12,251,577 | B2* | 3/2025 | Riad | A61N 5/1045 |
| 12,296,196 | B2* | 5/2025 | Ni | A61N 5/1049 |
| 12,311,200 | B2* | 5/2025 | Camps | A61N 5/1068 |
| 12,350,523 | B2* | 7/2025 | Dempsey | A61N 5/1049 |
| 2001/0021806 | A1 | 9/2001 | Gueziec et al. | |
| 2010/0266186 | A1 | 10/2010 | Hebrank et al. | |

OTHER PUBLICATIONS

Keesman, Rick, et al., "Correcting geometric image distortions in slice-based 4D-MRI on the MR-linac", Medical Physics 46.7, (May 21, 2019), 3044-3054.

"European Application No. 23200260.0, Extended European Search Report dated Feb. 19, 2024", (Feb. 19, 2024), 8 pgs.

Janke, Andrew, "Use of spherical harmonic deconvolution methods to compensate for nonlinear gradient effects on MRI images", Magnetic Resonance in Medicine: An Official Journal of the International Society for Magnetic Resonance in Medicine 52.1, (Jul. 1, 2004), 115-122.

* cited by examiner

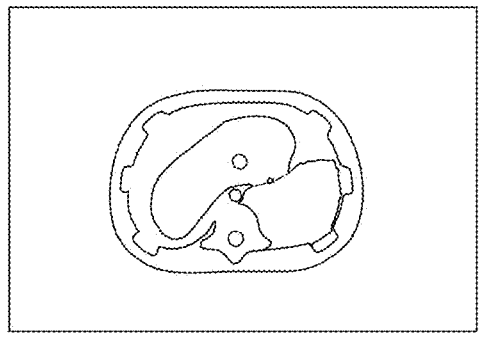
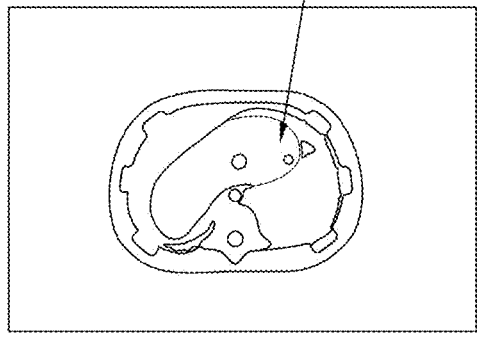
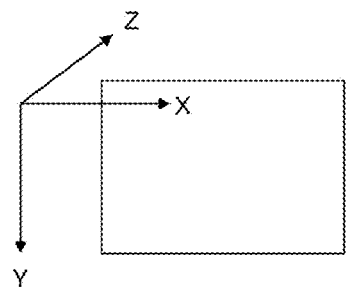
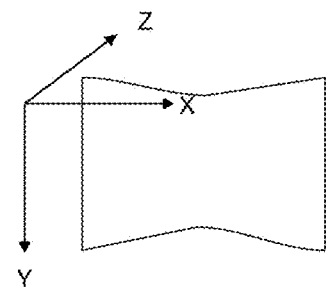
FIG. 4a　　　　　　　　FIG. 4b

MRI-BASED MOTION MONITORING AND GATING FOR RADIOTHERAPY

CLAIM FOR PRIORITY

This application claims the benefit of priority of British Application Serial No. 2214228.5, filed Sep. 28, 2022, which is hereby incorporated by reference in its entirety.

TECHNICAL FIELD

This disclosure relates to monitoring the position of a subject during radiotherapy, and controlling a radiotherapy device based on the position of the subject, and in particular gating a radiotherapy treatment beam based on the position of the subject.

BACKGROUND

Radiotherapy can be described as the use of ionising radiation, such as X-rays, to treat a human or animal body. Radiotherapy is commonly used to treat tumours within the body of a patient or subject. In such treatments, ionising radiation is used to irradiate, and thus destroy or damage, cells which form part of the tumour.

A radiotherapy device typically comprises a gantry which supports a beam generation system, or other source of radiation, which is rotatable around a patient. For example, for a linear accelerator (linac) device, the beam generation system may comprise a source of radio frequency energy, a source of electrons, an accelerating waveguide, beam shaping apparatus, etc.

A radiotherapy workflow typically involves a treatment planning phase which occurs prior to the actual treatment in which the cells forming part of the tumour are irradiated with ionising radiation. The treatment planning phase might occur months, weeks, days or hours in advance of the treatment. During the treatment planning, a subject is imaged using a conventional imaging technique (such as CT or MRI) to generate a 3D pre-treatment image of the subject and to identify the location of the target region to be irradiated (i.e. the location of the tumour). A treatment plan is devised which may include doses and angles of delivery, among other parameters defining the treatment to be applied to the target region.

In radiotherapy treatment, it is desirable to deliver a prescribed dose of radiation to the target region of a subject and to limit irradiation of other parts of the subject, i.e. to healthy tissue. Motion of the subject can cause a decreased dose to be applied to the target region and/or an increased dose to be applied to the healthy tissue. To address this, known techniques include monitoring a location of the subject and gating the treatment beam such that radiation is applied only when the subject (i.e. the target region within the subject) is in a desired location and not when the subject/target region is in a suboptimal location. This improves clinical outcomes.

There are various physiological motions that can contribute to a total motion of a subject. Gross or large-scale movements of a subject may include shifting position, coughing or sneezing. The subject may also undergo cyclical, physiological movement. For example, the subject may undergo respiratory motion due to their breathing cycle. The subject may also undergo cardiac motion based on beating of their heart. These motions can alter the location of a subject and/or of a tumour in a time-dependent manner relative to the respective location of the subject and/or of the tumour in the 3D pre-treatment image.

In order to monitor the motion and location of the subject at the time of treatment, the subject is imaged in real-time (i.e. during or immediately before radiotherapy treatment), for example using an MRI scanner. The location of the subject's anatomy, and in particular the location of the target region during the radiotherapy treatment, can be determined in real-time from MR (magnetic resonance) images. To accurately delineate the target region and to ensure that the radiation is delivered to the target region and not to healthy tissue surrounding the target region, the real-time MR images can be compared against the 3D pre-treatment image to determine whether the real-time position of the target region within the subject has changed relative to the position of the target region in the 3D pre-treatment image (upon which the radiotherapy treatment plan is based). The radiotherapy treatment plan can be updated based on the real-time location of the target region to ensure that the radiation delivered to healthy tissue is limited. The radiotherapy beam can be controlled based on the real-time location of the target region relative to the location of the target region in the 3D pre-treatment image, for example the radiotherapy beam may be gated to limit the radiation delivered to healthy tissue when the real-time location of the target region differs from the location of the target region in the 3D pre-treatment image.

The comparison of the real-time location and pre-treatment location of the target region may be visualised, for example by displaying a superposition of corresponding 2D slices of real-time MR images and pre-treatment images.

To ensure an accurate visualisation of the real-time and pre-treatment images, and to ensure accurate control of the radiotherapy beam based on the real-time images, it is important that the real-time and pre-treatment images can be accurately mapped to one another. However, non-linear components of the magnetic fields generated by the gradient coils used in MR imaging techniques can lead to geometrical distortion in the resulting MR images. The geometrical distortion can lead to discrepancies between the real-time and pre-treatment images, making it difficult to accurately delineate the target region in the real-time images and determine whether the location of the target image has changed.

SUMMARY

In accordance with a first aspect of the present disclosure, there is provided a computer implemented method for monitoring the position of a subject during radiotherapy. The method comprises obtaining an MR image slice of a subject that exhibits through-plane distortion, obtaining a pre-treatment image slice of the subject corresponding to the MR image slice that also exhibits through-plane distortion corresponding to the through-plane distortion of the MR image slice, and comparing the MR image slice with the corresponding pre-treatment image slice.

In accordance with a second aspect of the present disclosure, there is provided a system comprising one or more processors, and one or more computer-readable media storing instructions that, when executed by the one or more processors, cause the one or more processors to carry out any of the methods described herein.

In accordance with a third aspect of the present disclosure, there is provided a computer-readable medium storing instructions that, when executed by one or more processors, cause the one or more processors to carry out any of the methods described herein.

In accordance with a fourth aspect of the present disclosure, there is provided a radiotherapy device comprising a radiation source configured to generate a radiotherapy beam for irradiating a subject, an MR imaging apparatus configured to generate MR image slices of the subject, and a controller communicatively coupled to the radiation source and the MR imaging apparatus. The controller is configured to obtain, using the MR imaging apparatus, an MR image slice of the subject exhibiting through-plane distortion, obtain a pre-treatment image slice of the subject corresponding to the MR image slice that also exhibits through-plane distortion corresponding to the through-plane distortion of the MR image slice, and compare the MR image slice with the corresponding pre-treatment image slice.

BRIEF DESCRIPTION OF THE DRAWINGS

Specific embodiments are now described, by way of example only, with reference to the drawings, in which:

FIG. 4a depicts an undistorted 2D MR image slice acquired in a flat plane;

FIG. 4b depicts a distorted 2D MR image slice acquired in a curved plane;

DETAILED DESCRIPTION

Radiotherapy Apparatus

Figure 1:
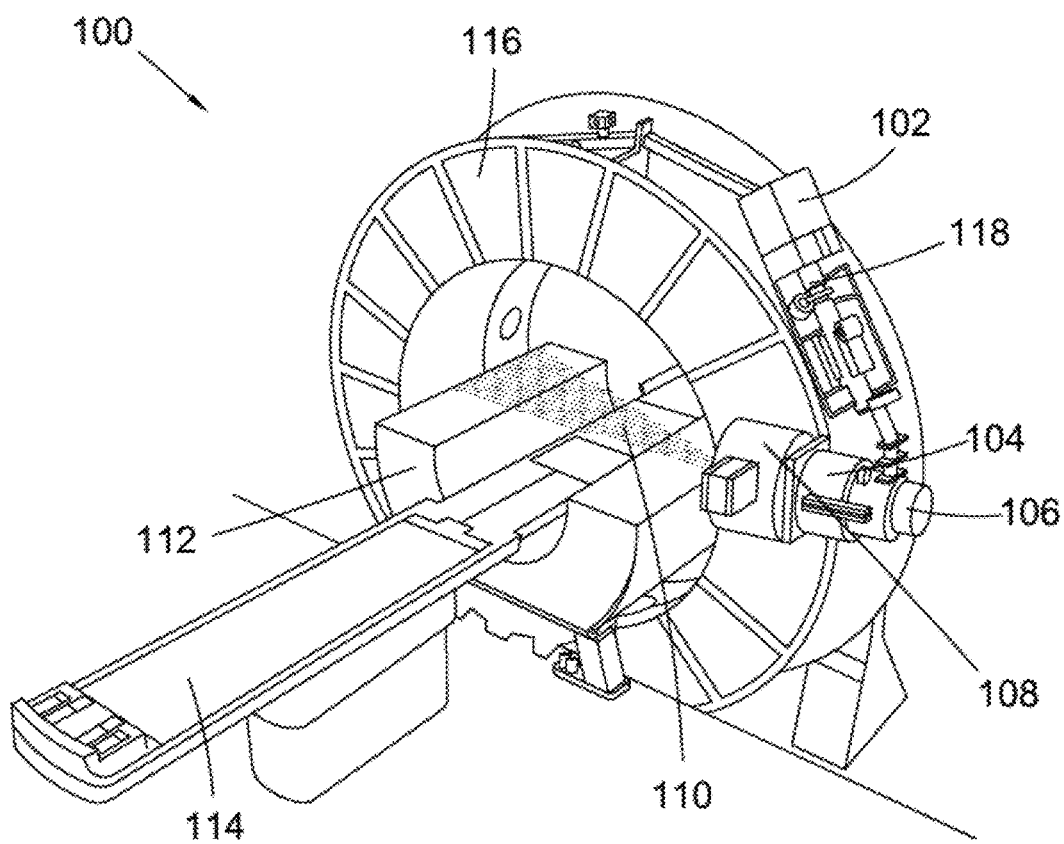
FIG. 1 depicts a radiotherapy device or apparatus according to the present disclosure.

FIG. 1 depicts a radiotherapy device suitable for delivering, and configured to deliver, a beam of radiation to a patient during radiotherapy treatment. The device and its constituent components will be described generally for the purpose of providing useful accompanying information for the present invention. The device depicted in FIG. 1 is in accordance with the present disclosure and is suitable for use with the disclosed systems and apparatuses.

The device 100 depicted in FIG. 1 is an MR-linac. The device 100 comprises both MR imaging apparatus 112 and radiotherapy (RT) apparatus which may comprise a linac device. The MR imaging apparatus 112 is shown in cross-section in the diagram. In operation, the MR scanner produces MR images of the patient, and the linac device produces and shapes a beam of radiation and directs it toward a target region within a patient's body in accordance with a radiotherapy treatment plan. The depicted device does not have the usual 'housing' which would cover the MR imaging apparatus 112 and RT apparatus in a commercial setting such as a hospital.

The MR-linac device depicted in FIG. 1 comprises a source of radiofrequency (RF) waves 102, a waveguide 104, a source of electrons 106, a source of radiation, a collimator 108 such as a multi-leaf collimator configured to collimate and shape the beam, MR imaging apparatus 112, and a patient support surface 114. In use, the device would also comprise a housing (not shown) which, together with the ring-shaped gantry, defines a bore. The moveable support surface 114 can be used to move a patient, or other subject, into the bore when an MR scan and/or when radiotherapy is to commence. The MR imaging apparatus 112, RT apparatus, and a subject support surface actuator are communicatively coupled to a controller or processor. The controller is also communicatively coupled to a memory device comprising computer-executable instructions which may be executed by the controller.

The RT apparatus comprises a source of radiation and a radiation detector (not shown). Typically, the radiation detector is positioned diametrically opposed to the radiation source. The radiation detector is suitable for, and configured to, produce radiation intensity data. In particular, the radiation detector is positioned and configured to detect the intensity of radiation which has passed through the subject. The radiation detector may also be described as radiation detecting means, and may form part of a portal imaging system.

The radiation source may comprise a beam generation system. For a linac, the beam generation system may comprise the source of radiofrequency waves 102, an electron gun 106, and a waveguide 104. The radiation source is attached to the rotatable gantry 116 so as to rotate with the gantry 116. In this way, the radiation source is rotatable around the patient so that the treatment beam 110 can be applied from different angles around the gantry 116. In a preferred implementation, the gantry is continuously rotatable. In other words, the gantry can be rotated by 360 degrees around the patient, and in fact can continue to be rotated past 360 degrees. The gantry may be ring-shaped. In other words, the gantry may be a ring-gantry.

The source of radiofrequency waves 102, such as a magnetron, is configured to produce radiofrequency waves. The source of radiofrequency waves 102 is coupled to the waveguide 104 via circulator 118, and is configured to pulse radiofrequency waves into the waveguide 104. Radiofrequency waves may pass from the source of radiofrequency waves 102 through an RF input window and into an RF input connecting pipe or tube. A source of electrons 106, such as an electron gun, is also coupled to the waveguide 104 and is configured to inject electrons into the waveguide 104. In the electron gun 106, electrons are thermionically emitted from a cathode filament as the filament is heated. The temperature of the filament controls the number of electrons injected. The injection of electrons into the waveguide 104 is synchronised with the pumping of the radiofrequency waves into the waveguide 104. The design and operation of the source of radiofrequency waves 102, electron source and the waveguide 104 is such that the radiofrequency waves accelerate the electrons to very high energies as the electrons propagate through the waveguide 104.

The design of the waveguide 104 depends on whether the linac accelerates the electrons using a standing wave or travelling wave, though the waveguide typically comprises a series of cells or cavities, each cavity connected by a hole or 'iris' through which the electron beam may pass. The cavities are coupled in order that a suitable electric field pattern is produced which accelerates electrons propagating through the waveguide 104. As the electrons are accelerated in the waveguide 104, the electron beam path is controlled by a suitable arrangement of steering magnets, or steering coils, which surround the waveguide 104. The arrangement of steering magnets may comprise, for example, two sets of quadrupole magnets.

Once the electrons have been accelerated, they may pass into a flight tube. The flight tube may be connected to the waveguide by a connecting tube. This connecting tube or connecting structure may be called a drift tube. The electrons travel toward a heavy metal target which may comprise, for example, tungsten. Whilst the electrons travel through the flight tube, an arrangement of focusing magnets act to direct and focus the beam on the target.

To ensure that propagation of the electrons is not impeded as the electron beam travels toward the target, the waveguide 104 is evacuated using a vacuum system comprising a vacuum pump or an arrangement of vacuum pumps. The pump system is capable of producing ultra-high vacuum (UHV) conditions in the waveguide 104 and in the flight tube. The vacuum system also ensures UHV conditions in the electron gun. Electrons can be accelerated to speeds approaching the speed of light in the evacuated waveguide 104.

The source of radiation is configured to direct a beam 110 of therapeutic radiation toward a patient positioned on the patient support surface 114. The source of radiation may comprise a heavy metal target toward which the high energy electrons exiting the waveguide are directed. When the electrons strike the target, X-rays are produced in a variety of directions. A primary collimator may block X-rays travelling in certain directions and pass only forward travelling X-rays to produce a treatment beam 110. The X-rays may be filtered and may pass through one or more ion chambers for dose measuring. The beam can be shaped in various ways by beam-shaping apparatus, for example by using a multi-leaf collimator 108, before it passes into the patient as part of radiotherapy treatment.

In some implementations, the source of radiation is configured to emit either an X-ray beam or an electron particle beam. Such implementations allow the device to provide electron beam therapy, i.e. a type of external beam therapy where electrons, rather than X-rays, are directed toward the target region. It is possible to 'swap' between a first mode in which X-rays are emitted and a second mode in which electrons are emitted by adjusting the components of the linac. In essence, it is possible to swap between the first and second mode by moving the heavy metal target in or out of the electron beam path and replacing it with a so-called 'electron window'. The electron window is substantially transparent to electrons and allows electrons to exit the flight tube.

The subject or patient support surface 114 is configured to move between a first position substantially outside the bore, and a second position substantially inside the bore. In the first position, a patient or subject can mount the patient support surface. The support surface 114, and patient, can then be moved inside the bore, to the second position, in order for the patient to be imaged by the MR imaging apparatus 112 and/or imaged or treated using the RT apparatus. The movement of the patient support surface is effected and controlled by a subject support surface actuator, which may be described as an actuation mechanism. The actuation mechanism is configured to move the subject support surface in a direction parallel to, and defined by, the central axis of the bore. The terms subject and patient are used interchangeably herein such that the subject support surface can also be described as a patient support surface. The subject support surface may also be referred to as a moveable or adjustable couch or table.

The radiotherapy apparatus/device depicted in FIG. 1 also comprises MR imaging apparatus 112. The MR imaging apparatus 112 is configured to obtain images of a subject positioned, i.e. located, on the subject support surface 114. The MR imaging apparatus 112 may also be referred to as the MR imager. The MR imaging apparatus 112 may be a conventional MR imaging apparatus operating in a known manner to obtain MR data, for example MR images. The skilled person will appreciate that such a MR imaging apparatus 112 may comprise a primary magnet, one or more gradient coils, one or more receive coils, and an RF pulse applicator. The operation of the MR imaging apparatus is controlled by the controller.

The controller is a computer, processor, or other processing apparatus. The controller may be formed by several discrete processors; for example, the controller may comprise an MR imaging apparatus processor, which controls the MR imaging apparatus; an RT apparatus processor, which controls the operation of the RT apparatus; and a subject support surface processor which controls the operation and actuation of the subject support surface. The controller is communicatively coupled to a memory, e.g. a computer readable medium.

The linac device also comprises several other components and systems as will be understood by the skilled person. For example, in order to ensure the linac does not leak radiation, appropriate shielding is also provided.

The radiotherapy device may be configured to perform any of the method steps presently disclosed and may comprise computer executable instructions which, when executed by a processor, cause a processor to perform any of the method steps presently disclosed. Any of the steps that the radiotherapy device is configured to perform may be considered as method steps of the present disclosure and may be embodied in computer executable instructions for execution by a processor.

Magnetic Resonance Imaging

MR imaging is an imaging technique which involves placing a subject in a strong magnetic field which aligns the magnetic moments of protons in the subject to produce a net magnetization. Irradiating the subject with RF pulses of a particular resonant frequency tips the net magnetization of these protons by a flip-angle $\alpha°$ into a plane perpendicular to the strong magnetic field. Immediately after the RF pulse is completed, the tipped net magnetization of these protons realigns with the strong magnetic field. The changing magnetic flux generated during realignment induces a voltage in a coil. This is measured and analysed to provide information on the distribution of different tissues within the subject.

While the skilled person will be familiar with MR imaging techniques, the following explanation of the general principles is provided below.

Figure 2:
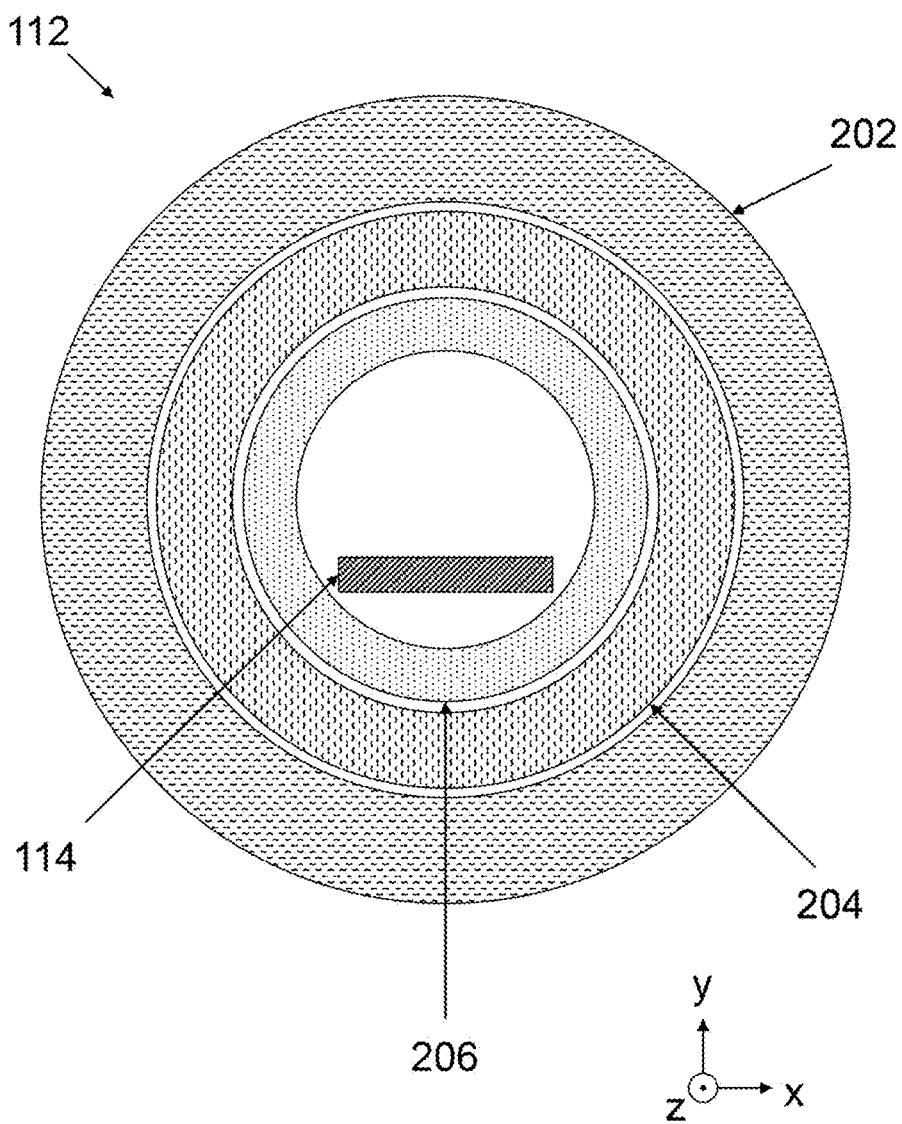
FIG. 2 depicts a schematic of an MR imaging apparatus according to the present disclosure.

FIG. 2 depicts a schematic of an MR imaging apparatus 112. The MR imaging apparatus 112 may be comprised in the device 100. FIG. 2 depicts a view of the MR imaging apparatus 112 taken along the bore of the MR imaging apparatus 112 and/or of the gantry 116. This bore is depicted as being oriented along the z-axis. The end of the patient support surface 114 is also depicted in FIG. 2. As shown in FIG. 2, the MR imaging apparatus 112 comprises a primary magnetic field coil 202, a magnetic gradient coil 204 and an RF coil 206. Each of these may have cylindrical symmetry around the bore and each may be positioned concentrically around the bore.

The primary magnetic field coil 202 is configured to produce a constant magnetic field along the bore of the MR imaging apparatus. This constant magnetic field is oriented in the z-direction in FIG. 2. This constant magnetic field coil is of high strength, typically of the order of one or more Tesla.

The magnetic gradient coil 204 is configured to generate a spatially varying magnetic field in the image of the bore, i.e. within a subject positioned on the patient support surface 114. The spatially varying magnetic field is in the same direction as the constant magnetic field produced by the primary magnetic field coil 202, i.e. in the z-direction. However, this magnetic field in the z-direction may vary (in strength) in dependence on location along x, y or z axes. The magnetic gradient coil 204 may include an x-direction magnetic gradient coil and/or a y-direction magnetic gradient coil and/or a z-direction magnetic gradient coil. Each of these gradient coils may be configured to generate a spatially varying field in the z-direction which varies along a particular axis. For example, the x-direction magnetic gradient coil may generate a magnetic field in the z-direction which varies along the x-axis. Similarly, the y-direction magnetic gradient coil may generate a magnetic field in the z-direction which varies along the y-axis. The z-direction magnetic gradient coil may generate a magnetic field in the z-direction which varies along the z-axis.

The RF coil 206 is configured to generate RF pulses and to detect MR signals produced in the subject in response to these RF pulses. When a current is passed through the RF coil 206, an oscillating/rotating magnetic field is produced in the bore. This magnetic field is perpendicular to the constant magnetic field produced by the primary magnetic field coil 202. Conversely, changing magnetic fields of the protons of the subject induce a voltage in the RF coil 206 which can be analysed to derive information on the distribution of tissue within the subject. The RF coil 206 may comprise a transmitter coil configured to generate the RF pulses and a receiver coil configured to detect the MR signals. Alternatively, the same coil may be used for both transmitting and receiving.

The MR imaging apparatus 112 may additionally comprise one or more of thermal insulation, magnetic shielding and RF shielding. These may be disposed between and/or around the outside of one or more of the coils described above. The MR imaging apparatus 112 may comprise an MR controller which controls the MR imaging apparatus 112. The MR controller may be a computer, processor, or other processing apparatus. The MR controller may be communicatively coupled to a memory, e.g. a computer readable medium. The MR controller may be communicatively coupled to one or more other components of the device 100 and/or to one or more controllers thereof.

In operation, MR images are generated using a pulse sequence, which may be stored in or communicated to the MR controller. The pulse sequence includes gradient pulses to be applied by the magnetic gradient coil 204. The pulse sequence also includes RF pulses to be applied by the RF coil 206. Furthermore, the pulse sequence may include signal acquisition operations, which may be applied using an analog-to-digital converter. The pulse sequence may define properties of the gradient pulses and/or of the RF pulses. These properties may include one or more of amplitude, timing, frequency, phase and duration.

In MR imaging, the response of hydrogen nuclei in water molecules within the subject to the pulse sequence can be used to generate images of the subject. A hydrogen nucleus, i.e. a proton, may be described as a rotating positive charge, the rotation of which generates a magnetic field. This magnetic field is referred to as a magnetic moment. The magnetic moments can only occupy one of two quantum states, known as spin-up or spin-down. When no magnetic field is applied magnetic moments are randomly orientated due to non-uniform thermodynamic fluctuations. The constant magnetic field generated by the primary magnetic field coil 202 acts to align and anti-align the magnetic moments in the subject with this constant magnetic field. Overall, a net magnetization can be generated as there is typically an excess of magnetic moments aligned (i.e. spin-up) than anti-aligned (i.e. spin-down) with the magnetic field. Alignment and anti-alignment is possible due to the interaction of the constant magnetic field with each proton, which creates a torque that causes it to precess around the direction of the constant magnetic field, i.e. the z-direction. The frequency $\omega_0$ of this precession is equal to the constant magnetic field strength $B_0$ multiplied by a constant $\gamma$ known as the gyromagnetic ratio. This gyromagnetic ratio has different known values depending on the nucleus being considered. For Hydrogen nuclei, the gyromagnetic ratio is $2.67 \times 10^8$ rad s$^{-1}$ T$^{-1}$. The Larmor frequency $\omega_0$ of precession of Hydrogen nuclei in the subject can therefore be calculated for a particular applied constant magnetic field $B_0$. Applying an RF pulse at the Larmor frequency tips the net magnetization of the hydrogen nuclei through a flip-angle $\alpha°$ (into the transverse plane). Immediately after the RF pulse is completed, the tipped net magnetization realigns with the constant magnetic field. This produces an MR signal at the Larmor frequency, which induces a measurable voltage in the RF coil 206.

The above mechanism provides means for detecting the quantity of hydrogen nuclei (protons) in the sample, and therefore for determining information about the composition of the sample. However, it does not discriminate between protons in one part of a subject and protons in another part of the subject. In other words, it provides means for determining a measure of the total number of hydrogen nuclei in the subject, but not for providing an image mapping these spatially.

In order to discriminate between nuclei located at different locations, the magnetic gradient coil 204 is used to vary the magnetic field spatially. For example, the z-direction magnetic gradient coil may generate a magnetic field that increases from a negative value at a first end of the bore to zero in the centre of the bore to a positive value at a second, opposite, end of the bore. The total field experienced by the nuclei is then the sum of the constant magnetic field $B_0$ and this spatially varying magnetic field. An RF pulse applied by the RF coil 206 may have a certain narrow bandwidth around the Larmor frequency. The nuclei at the centre of the bore will experience a field causing them to precess at this same Larmor frequency, since the spatially varying field is zero at that point, and resonance will therefore occur causing a measurable MR signal to be produced. Towards the first or second end of the bore, the magnetic field, and therefore the frequency of precession, will be smaller or larger respectively, meaning that resonance with the applied RF pulse will not occur and a measurable signal will not be produced from these regions. In effect, a central region of the bore (in the z-direction) has been interrogated by the applied signals. Therefore, applying a magnetic field gradient in a given direction provides means for selecting a particular spatial slice along that direction for measurement. For the magnetic field varying in the z-direction as described above, this spatial slice will be in the x-y plane and will have a slice thickness in the z-direction. Varying the carrier frequency of the applied RF pulse in the presence of the spatially varying magnetic field enables different slices along this direction to be measured. Applying gradients in a different direction would enable spatially selective measurements to be taken along those respective directions.

While application of a gradient enables a particular slice of the subject to be selected for measurement, this alone does not provide measurements discriminating between different locations in the selected slice. Such 'in-plane' measurements can be performed using phase-encoding and frequency encoding. In the above example, these in-plane measurements are in the x-y plane.

Phase encoding can be applied in a direction perpendicular to the applied gradient, e.g. in the x-direction. A phase-encode gradient can be applied by varying the magnetic field along the x-direction. This causes the precession of the nuclei to increase or decrease in frequency depending on their location along the x-axis (i.e. from the left to the right of the bore as shown in FIG. 2). The spins of the nuclei are thereby caused to dephase to different extents. When the phase-encode gradient is turned off, the protons return to their original precession frequency, but retain this dephasing. However, protons at certain intervals along the x-direction will remain in phase due to the dephasing at these intervals being 360°, meaning that the protons at these intervals effectively remain in phase. The signals from these protons will add together rather than cancelling out and will therefore be measurable. Thus, applying a particular phase-encode gradient along the x-direction can be used to measure a sample at a particular interval or spatial frequency along the x-direction. The protons at that interval are picked out for measurement by the filter or comb that the application of the phase-encode gradient results in. Applying the RF signal multiple times, each time followed by application of a different respective phase-encode gradient, leads to a different filter or comb being applied since protons at different intervals will be picked out through being 360° out of phase (i.e. in phase). This enables different spatial locations in the x-direction to be measured.

To obtain measurements in the second in-plane direction, i.e. in the y-direction, frequency encoding can be used. A gradient is applied in the y-direction such that there is a slightly lower magnetic field at low y-values (towards the bottom of the bore as shown in FIG. 2) and a slightly higher magnetic field at high y-values (towards the top of the bore as shown in FIG. 2). This gradient is applied while the MR signal data is being measured. The gradient leads to slightly lower precession frequencies at the low y-values and slightly higher precession frequencies at the high y-values. The measured MR signal will comprise both the lower frequencies and the higher frequencies, as well as the frequency components between these extremes. The different frequencies in the MR signal can be differentiated and mapped to the different spatial locations along the y-direction.

Accordingly, the combination of phase encoding and frequency encoding provides in-plane measurements in the slice selected by the applied gradient. Varying the carrier frequency of the applied RF pulse enables different slices in a direction perpendicular to the plane of the slice to be measured. Therefore, these techniques enable three-dimensional information regarding a sample to be generated.

The magnetic fields of the nuclei induce a voltage in the radiofrequency coil 206, providing an MR signal. This output of the MR imaging process comprises raw data describing the frequencies of the MR signal. This raw data is k-space data. K-space data describes the spatial frequencies obtained from measurements of the sample. The k-space data can be represented as a 2D matrix of pixels with a frequency-encode axis and a phase-encode axis. Individual pixels within this matrix do not correspond to individual spatial locations of the subject. Instead, each pixel in the k-space matrix includes (partial) information relating to every spatial point that is measured in the sample. In order to obtain a spatial image from the k-space matrix, an inverse 2D Fourier transform can be applied to 'reconstruct' the image from the k-space data. This maps the measurements obtained, which are in terms of spatial frequencies, to measurements in terms of spatial locations within the sample. Where 3D k-space data is obtained and considered, the k-space matrix may be a 3D matrix of pixels with an additional dimension corresponding to the magnetic gradient direction. An inverse 3D Fourier transform may be applied to reconstruct a 3D image (i.e. 3D spatial information) from the k-space data.

Different types of tissue within the sample have different quantities of different atoms, which each have different proton densities and different spin-spin relaxation times and spin-lattice relaxation times. For example, fluids such as blood and spinal fluid have a higher proton density than bone due to containing a larger proportion of hydrogen atoms. As explained above, the RF signal applied can be tailored to cause a resonant response in hydrogen nuclei. The differences in the compositions of different body tissues enable these different types of tissue to be discriminated in the MR signal received. This enables generation of an image which shows different types of tissue with different contrast. For example, an image can be reconstructed which shows unhealthy tissue, such as a tumour, either lighter or darker than surrounding healthy tissue.

Generating an image depicting the prevalence of different types of tissue within a subject can be used to inform and/or guide treatments applied to the subject. For example, such an image may be used to guide radiotherapy treatment. The image may be used in treatment setup to determine a treatment plan, i.e. to determine an arrangement of angles and/or locations at which to apply radiotherapy. Alternatively, or in addition, the image may be generated and/or used during radiotherapy treatment to determine whether to halt or pause treatment. If a subject moves such that the location of the application of radiation and the location of the unhealthy tissue no longer coincide, the unhealthy tissue may receive a lower radiation dose than is desired and healthy tissue may receive a higher radiation dose than is desired. A beam may be gated in response to determining this movement based on the reconstructed image. However, the latency of such gating may be greater than desired. The unhealthy tissue may receive the lower than desired dose, and the healthy tissue may receive the higher than desired dose, for a length of time corresponding to the gating latency.

As described above, the application of magnetic field gradients in the x-, y-, and z-directions enables a 2D MR image slice to be reconstructed in the x-y plane at a particular location along the z-axis. A plurality of slices can be produced for different points along the z-axis to generate a 3D MR image.

Through-Plane Distortion

Whilst the discussion above describes how magnetic field gradients are used to produce MR images, this method is based on the assumption that the magnetic fields produced by the gradient coils used to produce the images vary only linearly. However, in practice this is often not the case as illustrated in FIG. 3 and described in more detail below.

The non-linear components of the varying magnetic fields generated by MRI gradient coils are known as concomitant fields and are a consequence of Maxwell's equations, i.e. $\nabla \cdot \vec{B}=0$. In radiotherapy, short imaging times are essential to reduce the treatment time. As will be appreciated by a person skilled in the art, the need for fast MR imaging requires rapid slew rates (to create the required magnetic fields), which necessitate both shorter gradient coils and a fewer number of coil turns. These constraints result in increased concomitant fields, making it difficult to maintain gradient linearity across the full range of the z-direction, as shown in FIG. 3.

Figure 3:
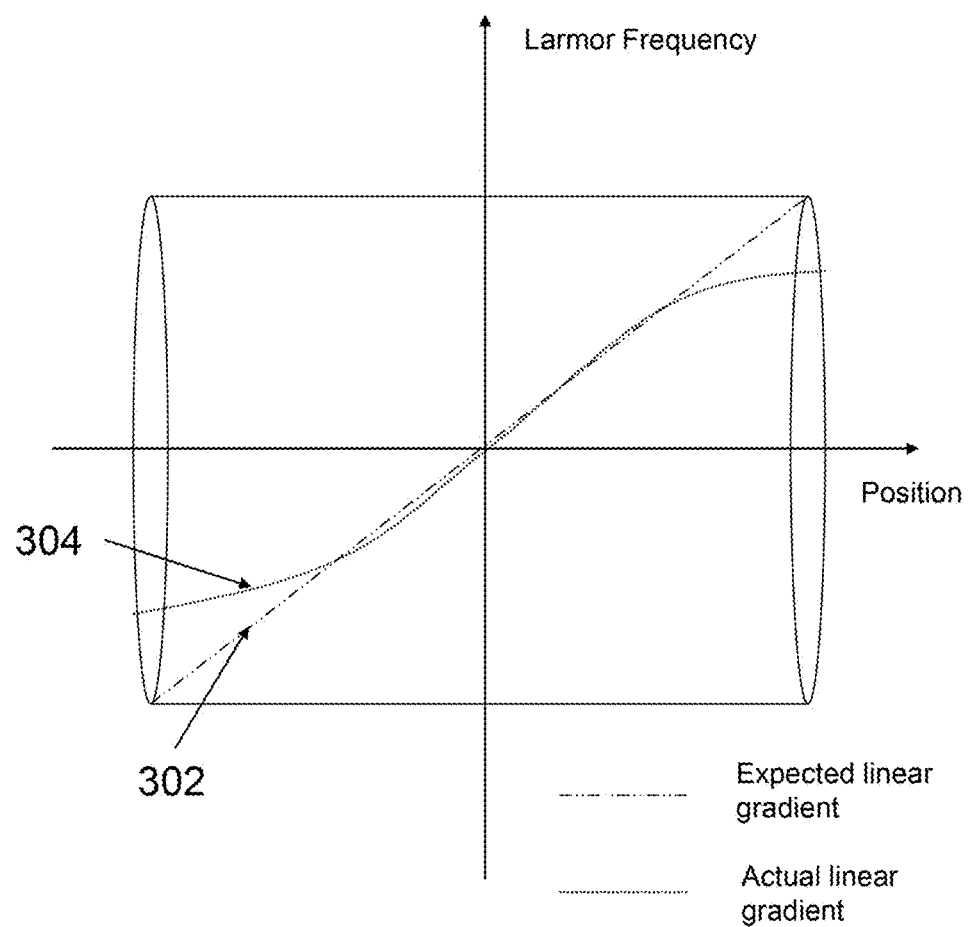
FIG. 3 depicts how the magnetic field gradient varies inside the bore on a radiotherapy apparatus according to the present disclosure.

FIG. 3 illustrates how the magnetic field gradient varies with position in the z-direction in the bore of a radiotherapy device. This is illustrated in terms of Larmor frequency (which, as noted above, is proportional to magnetic field strength for any given nuclei) against position (which in this case is the z-position along the z-axis through the bore). A cylindrical overlay is also illustrated which represents the bore of the radiotherapy device.

The straight line 302 represents the expected Larmor frequency (or expected strength of the magnetic field) through the bore. As can be seen from FIG. 3, this expected field strength has a linear gradient across the entire length of the bore. However, due to the engineering constraints as noted above, the actual magnetic field (represented by line 304) produced by the gradient coils does not increase linearly. In other words, the actual magnetic field gradient across the length of the bore (the z-direction) is non-linear. Whilst not shown in this image, the same non-linear gradient is found in the x- and y-direction due to similar constraints in the x-direction and y-direction gradient coils.

An effect of using non-linear magnetic field gradients in MR imaging is that the resulting MR image will exhibit geometrical distortion. For example, for an MR image slice acquired in the transverse orientation, the non-linearity in the x-direction and y-direction magnetic field gradients results in geometrical distortion in the plane of the image slice itself (i.e. the x-y plane). This is otherwise known as in-plane distortion. The non-linearity in the z-direction magnetic field gradient results in geometrical distortion through the plane of the slice (i.e. distortion in the z-direction). This is otherwise known as through-plane distortion. While described above for transverse MR image slices, similar distortions impact slices acquired in other orientations, such as the coronal or sagittal orientations.

The gradient non-linearity geometrical distortion can be modelled using the spherical harmonics approach. The distortion can be calculated by expanding the gradient field distribution using spherical harmonics as a basis function:

$$B_G(r, \theta, \phi) \equiv B_{GNL}(r, \theta, \phi) \equiv$$

$$\sum_{n=0}^{\infty}\sum_{m=0}^{n}\left(\frac{r}{r_0}\right)^n P_{nm}(\cos\theta)[A_{nm}\cos(m\phi) + B_{nm}\sin(m\phi)],$$

Where $B_G$ is the overall gradient field, separated into linear ($B_{GL}$) and non-linear components ($B_{GNL}$). $P_{nm}$ are the associated Legendre functions. In some examples, the maximum values for n and m, required to accurately approximate $B_G$, are 15. $r_o$ is a scaling constant (which, in some examples is 225 mm). $A_{nm}$ and $B_{nm}$ are the machine dependent spherical harmonic basis coefficients. These coefficients may be obtained in two steps. First the magnetic field produced by each gradient coil set must be sampled, for instance using a field probe. Then, the coefficients may be estimated by fitting the measured field values to the above-described spherical harmonics basis. r, $\theta$ and $\phi$ are the standard spherical polar coordinates. The distortion vector field is defined by: $B_{GNL}/G_r$, where $G_r$ is the readout gradient amplitude.

The non-linear components of the gradient field distribution ($B_{GNL}/G_r$) control the extent of geometrical distortion $x'=x+B_{GNL}/G_r$. This spherical harmonics model is a general model used for modelling magnetic distortions caused by any MRI coil.

The application of the spherical harmonics model to correct for gradient non-linearity distortion in an MR image is well-known to the skilled person and may be achieved by first converting $B_G(r, \theta, \phi)$ from spherical polar coordinates to Cartesian coordinates $B_G(x, y, z)$. Afterwards, deformation vector fields (DVFs) may be calculated from $B_G(x, y, z)$:

$$DVF_x(x, y, z) = \frac{B_{Gx}(x, y, z)}{G_x}$$

$$DVF_y(x, y, z) = \frac{B_{Gy}(x, y, z)}{G_y}$$

$$DVF_z(x, y, z) = \frac{B_{Gz}(x, y, z)}{G_z}$$

Next, the DVFs may be applied to interpolate the MR image from the uncorrected (MR) to corrected (MR') coordinate system:

$$MR'(x, y, z) =$$

$$J(x, y, z)MR(x + DVF_x(x, y, z), y + DVF_y(x, y, z), z + DVF_z(x, y, z))$$

Where J(x, y, z) is the multiplicative Jabobian operator, which is used to compensate for intensity changes resulting from the interpolation step.

$$J(x, y, z) = \begin{vmatrix} 1+\partial DVF_x/\partial x & \partial DVF_x/\partial y & \partial DVF_x/\partial z \\ \partial DVF_y/\partial x & 1+\partial DVF_y/\partial y & \partial DVF_y/\partial z \\ \partial DVF_z/\partial x & \partial DVF_z/\partial y & 1+\partial DVF_z/\partial z \end{vmatrix}$$

For volumetric MR imaging data, it is straightforward to apply the spherical harmonics method to correct for geometrical distortion. However, it is more challenging to apply the spherical harmonics distortion correction for a single MR imaging slice. This is because there is insufficient slice information to support interpolation in the through-plane direction. For this reason, single MR image slices are conventionally only corrected for in-plane distortion. i.e., only performing the interpolation step using $DVF_x(x, y, z)$ and $DVF_y(x, y, z)$. In other words, a single MR imaging slice taken in the x-y plane has insufficient information in the z-direction in order to correct for distortion in that z-direction. Thus, whilst it is possible to use the spherical harmonics method to correct for in-plane and through-plane geometrical distortion in a 3D image, it is not possible to use this method to correct for through-plane distortion in a single 2D slice. This means that MR image slices with an applied 2D in-plane distortion correction will still exhibit through-plane distortion.

One possible solution might be to acquire a stack of 2D slices in near real-time. Acquiring a stack of 2D slices, with a reasonable number of slices (in some examples, this could be 3 to 5 slices), would provide the necessary information in the z-direction to support a through-plane distortion correction. However, it is difficult to acquire a stack-of-slices with the spatio-temporal resolution required for gated or tracked deliveries. In some examples, slices acquired at a temporal resolution of 200 ms with an in-plane resolution of 2×2 mm² and thickness of 2 mm may be required. In other words, it is not possible to acquire the required number of adjacent slices in real-time to provide a real-time through-plane distortion correction for MR image slices. There thus exists a need to mitigate the effects of through-plane distortion present in real-time MR image slices.

The effect of the through-plane distortion is that 2D MR image slices are acquired in a curved plane instead of a flat plane. This is illustrated in FIGS. 4a and 4b, which show an undistorted 2D MR image slice as acquired in a flat plane (FIG. 4a), and a through-plane distorted 2D MR image as acquired in a curved plane (FIG. 4b). In more detail, the slice shown in FIG. 4a is taken from a 3D image that was acquired prior to treatment delivery. This is known as a pre-treatment MR image slice. This slice does not exhibit through-plane distortion because the 3D pre-treatment image has been fully distortion corrected. Thus, the content of this pre-treatment slice represents an image of the subject acquired in a flat plane. In contrast, the slice shown in FIG. 4b is a real-time 2D MR image slice taken at the time of treatment, which is acquired in a curved plane. An in-plane distortion correction has been applied to the slice of FIG. 4b, but this slice still exhibits through-plane distortion.

As can be seen from a comparison of these images, a through-plane distorted 2D slice acquired using the MR imaging apparatus 112 may have a different content compared to a pre-treatment slice that does not have any distortion. This is because the planes in which each image is acquired do not correspond to one another. The content of the pre-treatment slice is located at the same z-coordinate within the subject, since the pre-treatment slice shows features in a flat-plane. However, different x- and y-positions within the 2D MR image slice of FIG. 4b may have different z-coordinates in the subject due to the curvature of the plane in which the 2D MR image slice was acquired. This means that the z-coordinate for any given (x, y) in FIG. 4b may not correspond to the z-coordinate for the same (x, y) in FIG. 4a. The result is that the through-plane distorted slice may exhibit different features than the undistorted pre-treatment slice. In this particular example, an additional lesion 410 can be seen in the through-plane distorted slice of FIG. 4b, which is not present in the undistorted slice of FIG. 4a.

Figure 5:
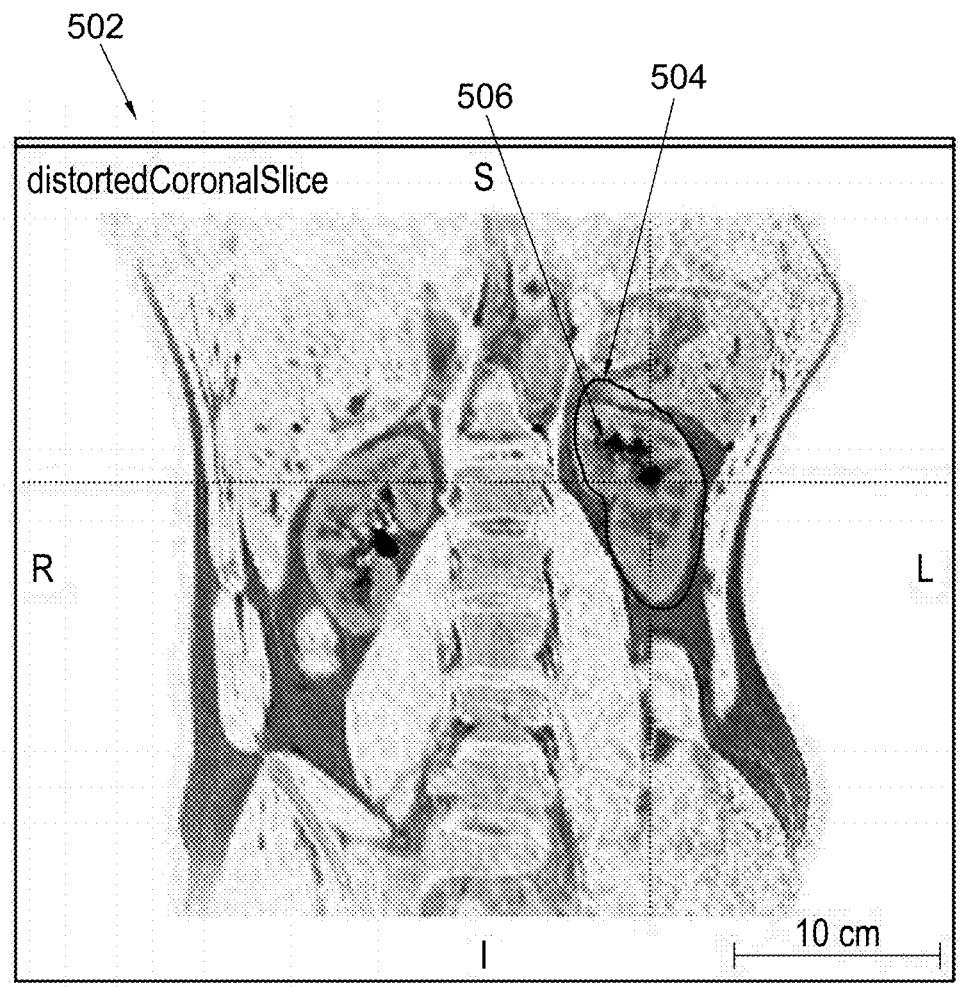
FIG. 5 depicts a contour extracted from an undistorted 2D pre-treatment image overlaid on a distorted 2D MR image slice.

FIG. 5 illustrates how through-plane distortion in two-dimensional (2D) MR image slices can cause other discrepancies when comparing with undistorted pre-treatment slices. In some examples, the comparison is made by extracting contours of features depicted in a 2D pre-treatment slice, and overlaying these contours on a corresponding 2D MR image slice. This is shown in FIG. 5, which illustrates a 2D MR image slice 502 acquired during the imaging phase, and a contour 504 extracted from a 2D pre-treatment slice that has been superimposed on the 2D MR image slice 502. The contour 504 represents the shape and location of a region which has been identified in the pre-treatment image. In this particular example, the contour corresponds to a kidney. As can be seen in the figure, the contour corresponds to a kidney region 506 illustrated in the 2D MR image slice 502, and the contour 504 has been superimposed over this region 506. It can be seen that the shape of the contour 504 roughly matches the outline of the kidney region 506, but there is not a perfect match between the two. This is because the 2D MR image slice 502 exhibits through plane distortion for the reasons as explained above (i.e. due to non linear magnetic field gradients used to acquire the image slice). In other words, the 2D MR image slice 502 is distorted in the z-direction (the direction normal to the plane of the slice). In contrast, the contour 504 is derived from a pre-treatment image slice which does not have any distortion. In other words, the pre-treatment slice is distortion corrected in both the in-plane and through-plane directions. As a result, there is a visible discrepancy between the shape of the kidney region outlined by the contour 504 and the shape of the kidney region depicted in the 2D MR image slice 502. This can make it difficult to correctly identify the relevant region in the 2D MR slice 502 that corresponds to the contour, and can also make it difficult to identify the correct location of the target region.

Motion Monitoring

Figure 6:
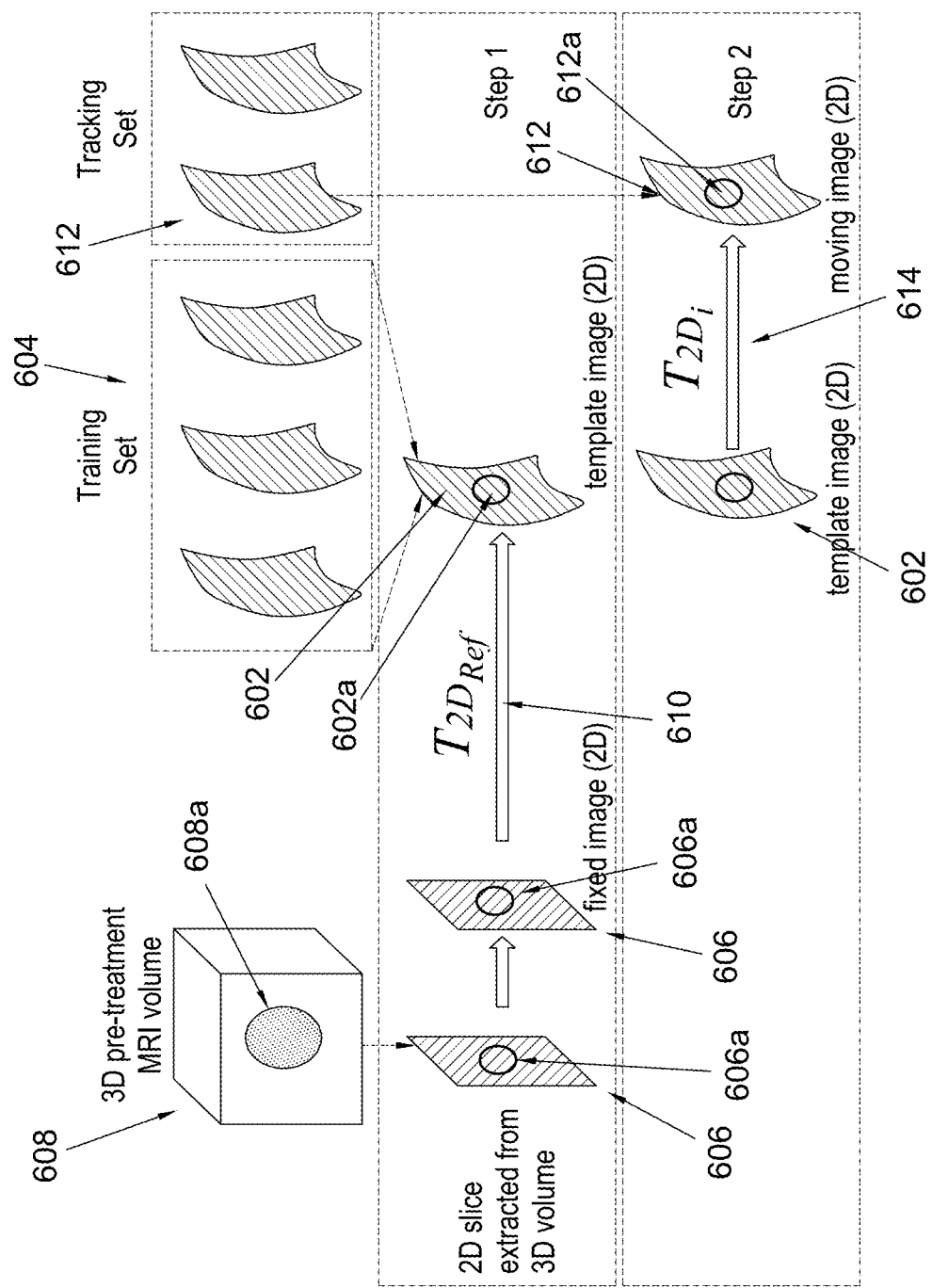
FIG. 6 depicts a known method for producing an image according to FIG. 5.

The overlay of the contour on the 2D MR image slice shown in FIG. 5 is produced using the multiple fixed plane algorithm depicted in FIG. 6. In the multiple fixed plane algorithm, 2D cine MR images are processed to generate a 3D displacement vector signal to monitor anatomical motion and consequently inform automatic gating decisions. The multiple fixed plane algorithm is based on a two-step process. In the first step, 2D slices are acquired in the sagittal and coronal orientations during a training phase (604). This phase is performed and completed immediately prior to treatment delivery with the patient in the treatment position. Based on the acquired 2D slices, template images (602) are calculated for the coronal and sagittal orientations. Afterwards, the slice (606), most similar to the template image, is extracted from the 3D pre-treatment image (608) and then registered to the template image (602). This leads to the computation of the absolute registration vector $T_{2D_{Ref}}$ (610). In other words, $T_{2D_{Ref}}$ is the geometrical transformation aligning the slice 606 and the template image 602. The 3D pre-treatment image is a 3D MR image of the subject which has been acquired during the initial daily plan adaptation stage of the clinical workflow with the patient in treatment position.

In the second step of the multiple fixed plane algorithm, near real-time coronal and sagittal 2D images are continuously acquired during the treatment delivery stage (i.e. tracking set) (612). Separately for each orientation (sagittal and coronal), the template image (602) is registered to each incoming slice (612), resulting in the computation of the relative registration vector $T_{2D_i}$ (614). In other words, $T_{2D_i}$ is the geometrical transformation aligning the slice 606 and the tracking set 612. The total translation, known as the anatomical position monitoring (APM) signal, is then given by:

$APM = T_{2D_{Ref}} + T_{2D_i}$. The APM signal describes the geometrical transformation between the target in the 3D pre-treatment image 608 and the target in the near real-time images acquiring during the treatment delivery phase (tracking image 612a). The APM signal can be used to inform gating decisions.

When creating a treatment plan, contours 608a are defined on the 3D pre-treatment image 608. In some examples, these defined contours might be the planning target image (PTV) or gross tumour image (GTV). These contours may be propagated to the continuously acquired tracking image 612a using the determined APM signal. The contours 606a correspond to the region of interest (the contours 608a) depicted in the 3D pre-treatment image. In conventional methods, the one or more slices 606 extracted from the pre-treatment image are fully distortion corrected (i.e. these slices exhibit no in-plane or through-plane distortion). This is because the 3D pre-treatment MRI image 608 itself is fully distortion corrected (for example, using the spherical harmonic distortion correction method described above). This is possible since the pre-treatment image is three-dimensional and so both in-plane and through-plane distortion correction are possible. The 3D pre-treatment image is always corrected for both in-plane and through-plane distortion to ensure geometrical fidelity when adapting the treatment plan. Ensuring geometrical fidelity in the 3D pre-treatment image mitigates systematic geographical errors when delivering dose. As such, any 2D slice extracted from the image represents a 2D image of the subject as acquired in a flat plane. This is seen in FIG. 6 in which the slices 606 are depicted as being flat and thus exhibit no through-plane distortion. The contours 606a contained in the slices 606 can then be extracted from the slices 606 in order to be overlaid on a 2D MR image slice 612.

In contrast to the pre-treatment slices or the contours extracted from the pre-treatment slices, 2D MR image slices that have been acquired in real-time (i.e. during the treatment phase or immediately before treatment) are acquired in a curved plane (as explained above) since these slices are not through-plane distortion corrected. The fact that the pre-treatment slices are fully distortion corrected whilst the MR image slices are only in-plane distortion corrected leads to the challenges described above in relation to FIGS. 4a, 4b and 5.

To address these and other issues encountered with known techniques, a new method is provided as described below in relation to FIG. 7.

Through-Plane Distortion Mitigation

Figure 7:
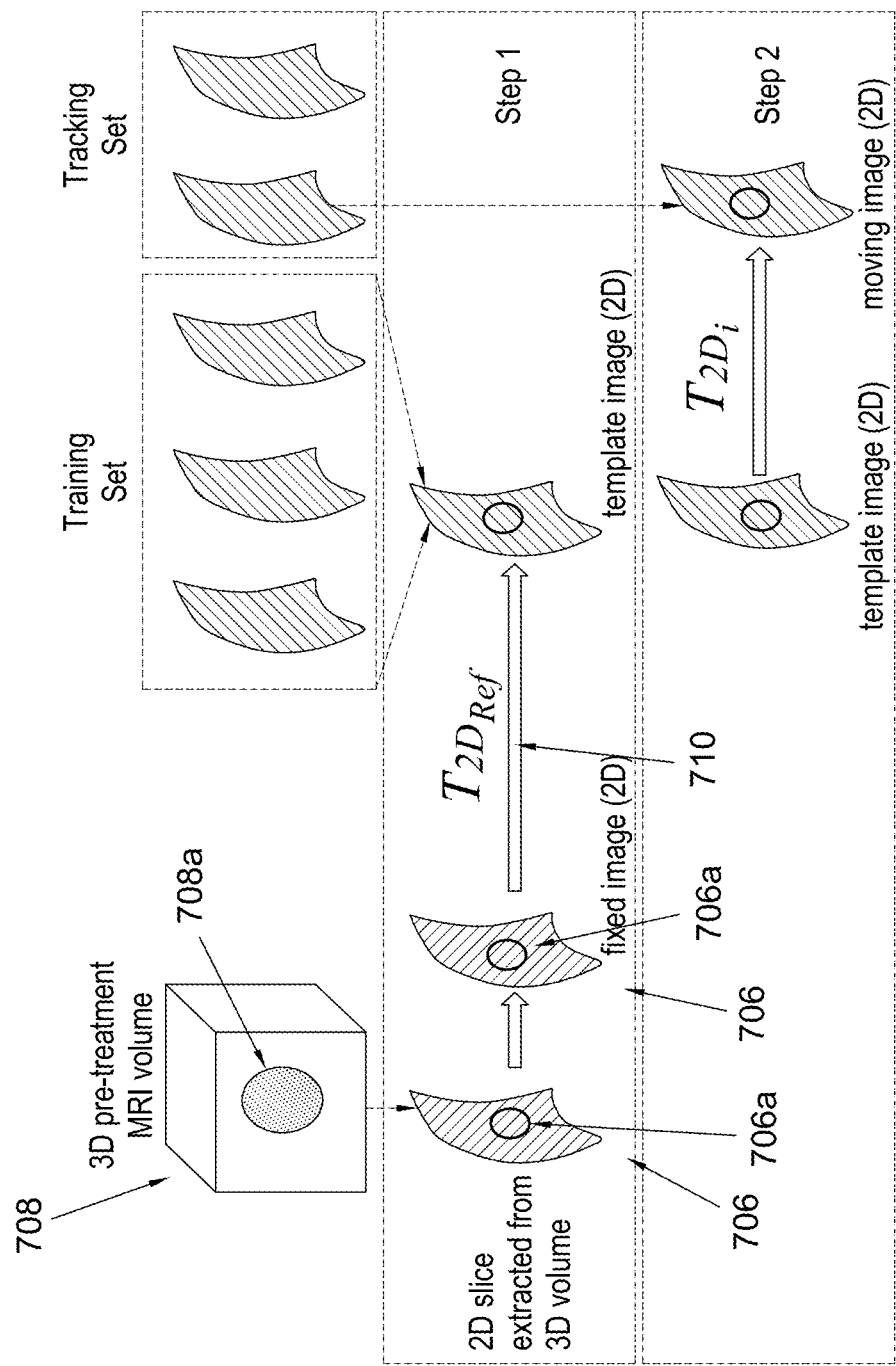
FIG. 7 depicts a method according to the present disclosure.

FIG. 7 depicts a method according to the present disclosure for monitoring the position of a subject during radiotherapy. The method is used to determine a motion-monitoring or APM signal by comparing 2D MR image slices acquired during or immediately prior to radiotherapy treatment, and corresponding 2D pre-treatment slices acquired as part of a daily plan adaptation treatment planning phase at an earlier time (for example, at the beginning of the clinical workflow).

Figure 9:
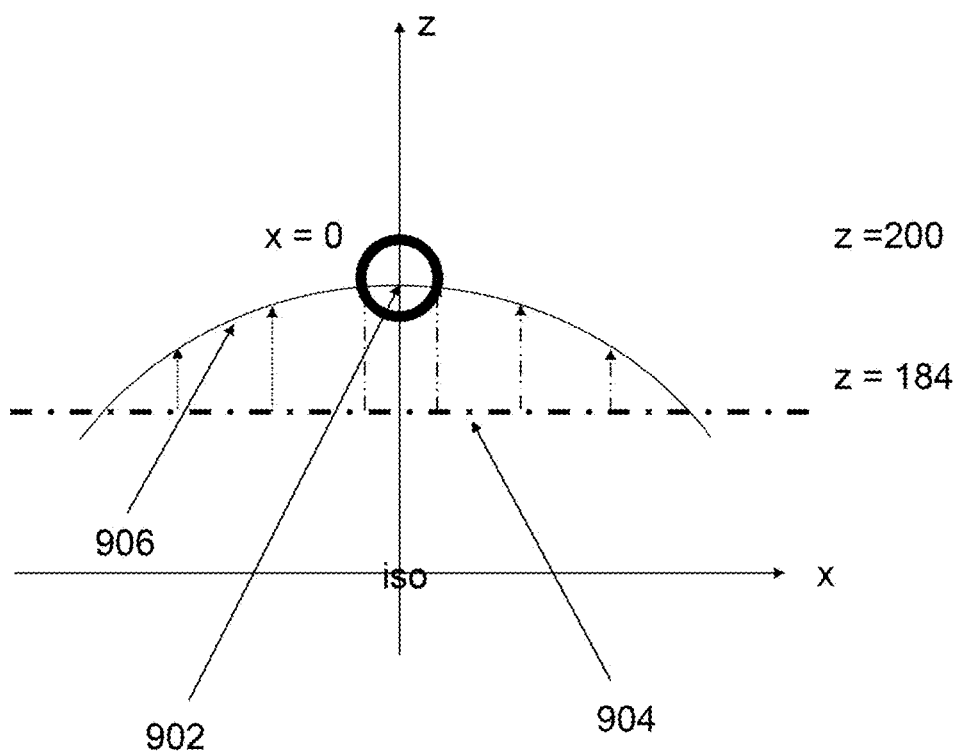
FIG. 9 depicts a schematic of applying a slice offset method.
Figure 10:
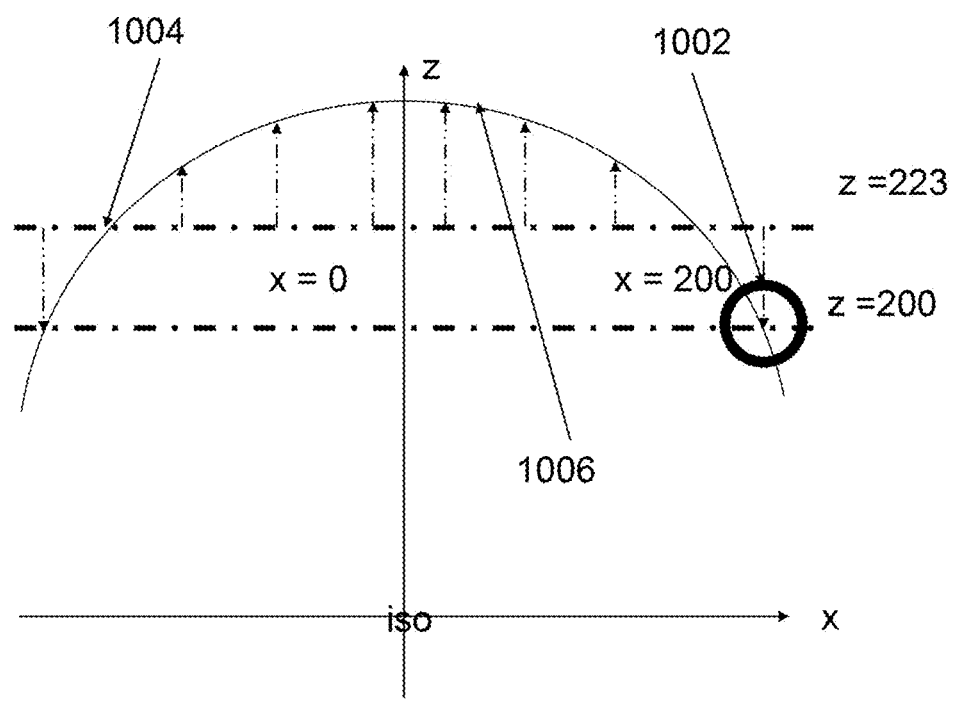
FIG. 10: 9 depicts an alternative schematic of applying a slice offset method.

To account for geometrical mismatch, a slice offset acquisition method is used. In the offset method, an MRI device calculates and then acquires the slice exhibiting the distorted structure's centre-of-mass, with zero through-plane geometrical distortion, at the position requested by a motion-manager sub-system. An example of how the slice offset correction works is shown in FIG. 9. If the motion-manager sub-system requests a slice at x=0, z=200 mm (902), the MRI device finds the curved plane that intersects the point at position z=184 mm (904). As through-plane distortion is uncorrected, the slice at z=184 mm will be distorted (906), such that its center is at x=0, z=200 mm (902). In the second example (FIG. 10), the motion-manager sub-system instead requests a slice with the structure's center-of-mass at x=200, z=200 mm (1002). In this instance, the MRI device acquires a slice at z=223 mm (1004) but the actual slice will be distorted (1006).

The multiple fixed plane algorithm described with reference to FIG. 6 does not consider the slice offset acquisition strategy of the MR device. In addition, it assumed that acquired slices were distortion corrected, both in the in-plane and through-plane. Thus, the conventional multiple fixed plane algorithm described above and shown in FIG. 6 does not account for through-plane distortion in 2D MR slices acquired during and immediately prior to treatment delivery, and so this leads to inaccuracies in determining the APM signal and displaying the overlay of contours (such as depicted in FIG. 5).

The integration of the slice offset acquisition strategy with the multiple fixed plane algorithm is described below.

Figure 11:
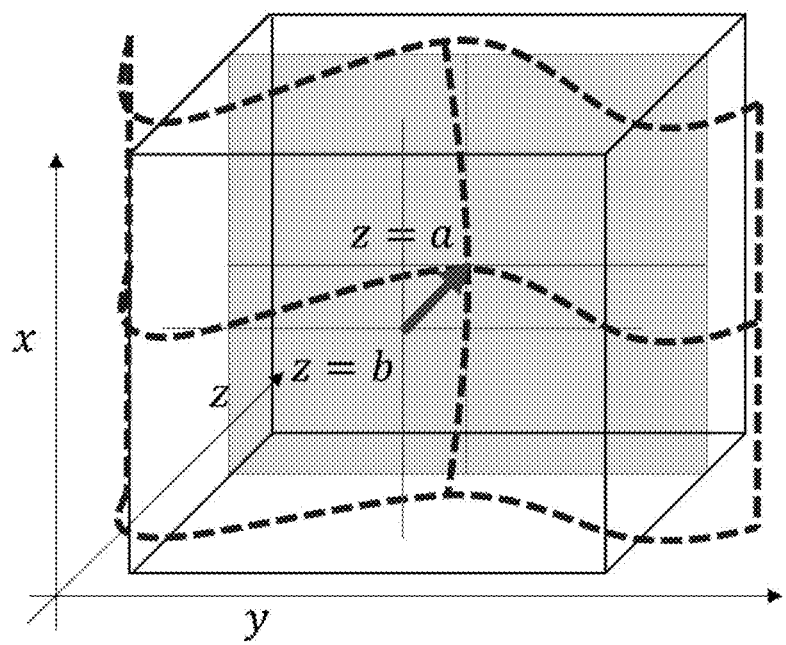
FIG. 11 depicts an alternative schematic of slice offset between a flat and a curved plane.

Let the centre of mass of the imaging slice requested by the motion-manager sub-system be at position z=a (FIG. 11). The MRI device then calculates that a slice acquired in the plane z=b, will exhibit through-plane distortion, such that its centre-point is at z=a.

The distorted image D's center-of-mass ($x_c$, $y_c$, a) must be the same as that in the motion-manager-requested slice (T):

$$D(x_c, y_c, a) = T(x_c, y_c, a)$$

Let $P(x_c, y_c, b)$ be the requested MRI slice position. A 2D in-plane distortion correction is already applied to P. Therefore, the $x_c$ and $y_c$ coordinates are equivalent in P and D:

$$P(x_c, y_c, b) = D(x_c, y_c, a - \Delta z(x_c, y_c, b))$$

Only the through-plane component of the distortion vector needs to be applied to the slice. Based on the above expression, the slice offset correction equation can be formulated as follows:

$$b + \Delta z(x_c, y_c, b) = a$$

Solving the slice offset correction equation enables the slice position b to be calculated by the MRI device. The above equation can be solved by minimizing the following least-squares cost-function over the b variable:

$$C_0 = \mathrm{argmin}_b \left( [b - a + \Delta z(x_c, y_c, b)]^2 \right)$$

The above formula can be generalized to any slice orientation as follows. Let C be the requested centroid position in the patient coordinate system. Let $\vec{N}$ be the vector normal to the slice. Let P be the point at which the distortion is computed: $P(x_P, y_P, z_P)$. Note that P can be anywhere along the normal to the slice going through C as only the through-plane distortion component is computed. P can be defined relative to C as follows:

$$P(x_P, y_P, z_P) + k, \vec{N} = C(x_C, y_C, z_C)$$

The point P is determined such that k equals to the through-plane distortion component at position P along the normal vector $\vec{N}$. The above can be solved by finding k that minimizes the following vector norm:

$$\sqrt{C_0} = \left\| C(x_C, y_C, z_C) - \left( P(x_P, y_P, z_P) + \text{through\_plane\_distortion}(P(x_P, y_P, z_P)).\vec{N} \right) \right\|$$

$$\sqrt{C_0} = \left\| k.\vec{N} - \text{through\_plane\_distortion}(P(x_P, y_P, z_P)).\vec{N} \right\|$$

This is equivalent to finding k that minimizes the following squared distance:

$$C_0 = \left( k - \text{through\_plane\_distortion}\left( C(x_C, y_C, z_C) - k.\vec{N} \right) \right)^2$$

Given the distortion model and slice offset correction, the distortion can be accounted for in the multiple-fixed plane algorithm and also the motion-manager sub-system display.

Once the slice-selected (i.e. k or b for simplicity) has been calculated, then the actual distorted slice acquired (706), and its associated through-plane distorted contours (706a), may be extracted from the 3D pre-treatment MR image (708). This may be performed in two ways. Firstly, the 3D pre-treatment MR image (708) could be interpolated along the curved slice (b+DVF$_z$(x, y, b)):

$$MR'(x, y, z) = MR(x, y, b + DVF_z(x, y, b))$$

Alternatively, the 3D distortion corrected pre-treatment image could be through-plane inverse distortion corrected (MR$_{2D}$), i.e. such that only a 2D in-plane distortion correction was applied. Then, the distorted slice acquired (706) could be extracted by looking up the closest slice to b or more accurately by interpolating at location b.

$$MR'(x,y,z) = MR_{2D}(x,y,b)$$

In this method, one or more 2D slices 706 are extracted from a 3D pre-treatment MRI image 708. The 3D pre-treatment image is a 3D image of the subject which has been acquired at an earlier time (for example during the daily plan adaptation stage). In this particular example, the 3D image has been acquired using MR imaging, however it would be appreciated by a person skilled in the art that any suitable imaging technique, such as CT, PET or the like can be used to produce the 3D image. The extracted slices 706 may contain 2D contours 706a (the circles depicted in the slices) outlining a region of interest within the slice. The contours 706a correspond to the region of interest 708a depicted in the 3D pre-treatment image 708 and can be extracted from the pre-treatment slice to be overlaid on a 2D MR image slice in a similar manner to that discussed above in relation to FIGS. 5 and 6.

Unlike in conventional methods such as that described above in relation to FIG. 6, in the method of FIG. 7 the 2D pre-treatment slices 706 are not fully distortion corrected. In contrast to conventional methods, the pre-treatment slices 706 instead exhibit through-plane distortion and thus represent a 2D image of the subject as acquired in a curved plane. The through-plane distortion in these extracted slices 706 corresponds to the through-plane distortion that is found in the 2D MR image slices that are acquired at the time of (or immediately before) radiotherapy treatment. This means that, in contrast to conventional methods in which the pre-treatment slice represents data in a flat-plane and the MR image slice represents data acquired in a curved plane, the method of FIG. 7 enables 2D pre-treatment image slices to be distorted in the same curved plane as the 2D MR image slices. As discussed in more detail below in relation to FIG. 8, using pre-treatment image slices that have through-plane distortion enables more accurate motion monitoring and delineation of target regions.

In an embodiment of the present disclosure, a pre-treatment slice with through-plane distortion correction is obtained by applying a through-plane distortion to a fully distortion corrected slice. In this way, the through-plane distortion correction is effectively reversed, since prior to applying the through-plane distortion, a through-plane distortion correction was already applied.

In an alternative embodiment, the 3D pre-treatment image may not have any through-plane distortion correction in the first place. In other words, the 3D pre-treatment image may already exhibit the same through-plane distortion as found in the corresponding 2D MR image slices. Thus, in this embodiment, a 2D slice extracted from the 3D image will have the same geometric distortion as a corresponding 2D MR image slice, and so a direct comparison can be made between these two slices without further distortion application or correction.

Figure 8:
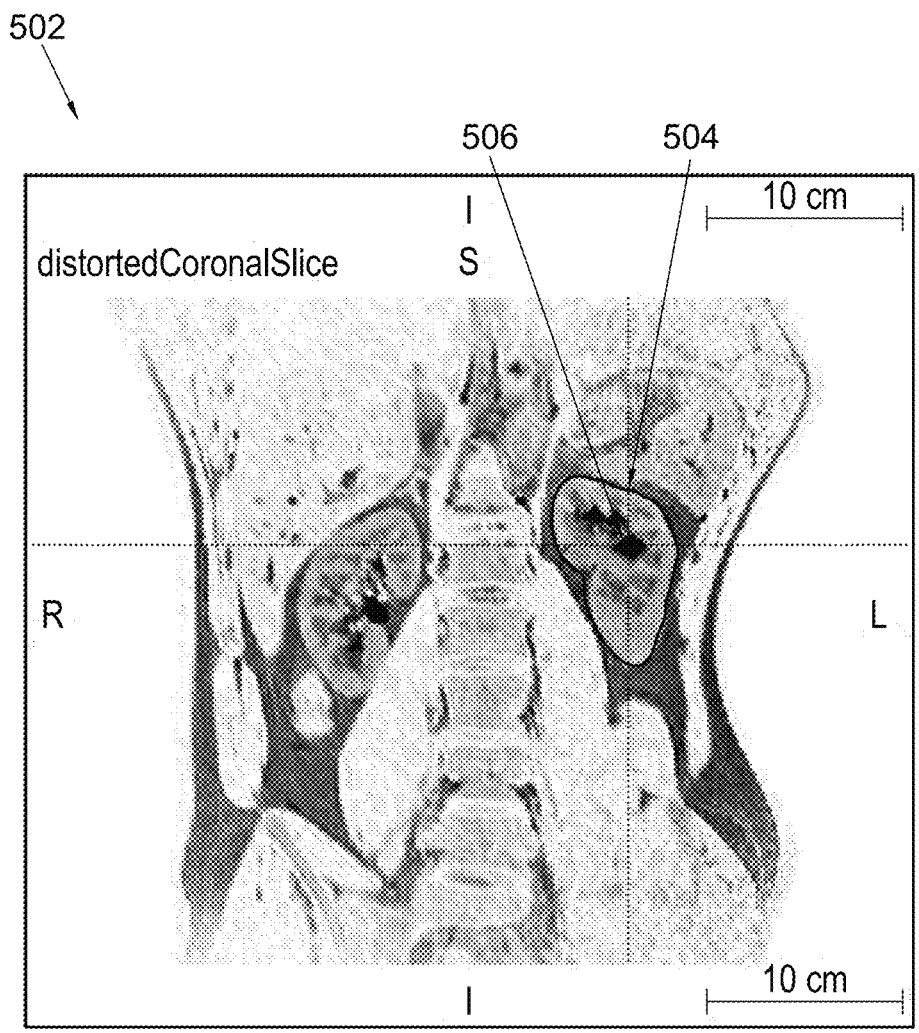
FIG. 8 depicts a contour extracted from a distorted 2D pre-treatment image overlaid on a distorted 2D MR image slice according to the present disclosure.

Turning to FIG. 8, this image illustrates how a distorted contour 804 matches a corresponding target region 806 in a distorted 2D MR image slice. In more detail, the image of FIG. 8 corresponds to the image of FIG. 5 (described above). The image shown in FIG. 5 is generated using conventional methods, such as that described above in relation to FIG. 6. This leads to a contour 504 with no through-plane distortion being overlaid on an image slice that has through-plane distortion. In contrast, the image shown in FIG. 8 is generated using a method according to the present disclosure, such as the method depicted in FIG. 7. As described above, the methods according to the present disclosure use 2D pre-treatment slices with a through-plane distortion that corresponds to the through-plane distortion found in the 2D MR image slices. As such, a contour (such as contour 804) outlining a target region that is extracted from such a distorted pre-treatment slice will have the same geometric distortion as a corresponding 2D MR image slice depicting the same target region. Therefore, as shown in FIG. 8, the contour 804 more accurately matches target region 806 when the contour is overlaid on the slice 802, since the contour and the slice have the same through-plane distortion.

The methods of the present disclosure therefore provide a more accurate visualisation of a contour from a pre-treatment slice overlaid on a 2D MR image slice, making it easier to delineate a target region and identify whether the position of the target region has moved (relative to the position in the pre-treatment image).

Referring back to FIG. 7, extracting the through-plane 2D distorted slice (706) from the 3D distortion corrected pre-treatment image (708), means that the absolute registration $T_{2D_{Ref}}$ (710) calculated between 706 and 708 is more accurate than in the previous method outlined in FIG. 6. $T_{2D_{Ref}}$ (710) is more accurate because the pre-treatment slice 706 and the real-time MR image slices are in the same frame of reference, i.e. both slices exhibit no in-plane distortion but do exhibit the same through-plane distortion. In this way, errors due to through-plane distortion have been mitigated. As shown by comparing FIGS. 8 and 5, improvements in $T_{2D_{Ref}}$ result in improved conformity of the contour around the anatomy. In addition, the improved accuracy of $T_{2D_{Ref}}$ results in improved accuracy of the tumour tracking signal (APM=$T_{2D_{Ref}}$+$T_{2D_i}$). Increased accuracy in the APM signal results in improved gating decisions and ultimately clinical outcome.

Figure 12:
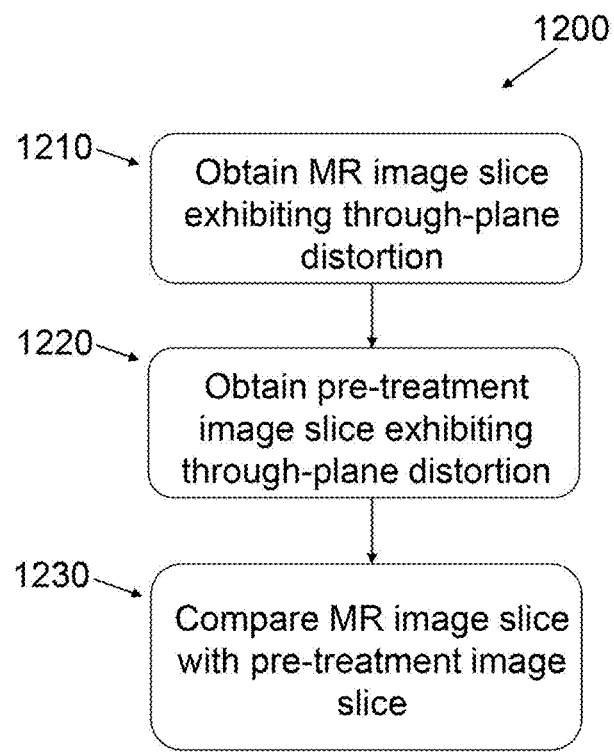
FIG. 12 depicts a method according to the present disclosure.

Referring now to FIG. 12, there is depicted a flowchart of a method 1200 according to the present disclosure. The method includes a step 1210 of obtaining an MR image slice of a subject (for example, a human or animal subject). Obtaining the image slice may involve taking an MRI scan of subject in real-time, for example using an imaging apparatus as described herein. Alternatively, obtaining the image slice may involve obtaining data representing the slice from a computer memory, in the case that the MR slice was acquired using MR imaging apparatus at an earlier time. As described herein, the MR image slice obtained in step 1210 exhibits through-plane distortion. In some examples, when the MR image slice was acquired using the imaging apparatus, the slice may have originally exhibited in-plane distortion as well. In some embodiments, the slice obtained at step 1210 has already had an in-plane distortion correction (such as a correction as described above) applied so that the MR image slice does not exhibit in-plane distortion.

At step 1220, a pre-treatment image slice of the subject is obtained. The pre-treatment image slice is an image slice that corresponds to the MR image slice in that both slices depict the same or at least similar regions of the body of the subject. In step 1220, the pre-treatment image slice is obtained from computer memory since the actual data representing the slice was acquired using an imaging technique at an earlier time. In more detail, the pre-treatment image slice may be obtained from a 3D pre-treatment image of the subject that was acquired at an earlier time (i.e. not in real-time, but 1 day, 1 week, 1 month or longer beforehand). The 3D image of the subject may have been acquired using any suitable imaging technique, such as CT, MRI, PET. In other words, whilst the method 1200 may take place alongside a radiotherapeutic treatment of a subject according to a treatment plan, the 3D pre-treatment image of the subject was acquired at an earlier time, for example during the planning phase of a radiotherapy workflow. The 3D pre-treatment image of the subject and/or its constituent slices of the 3D image may be stored in computer memory such that the pre-treatment image slice obtained at step 1220 is obtained from the computer memory. As described herein, the pre-treatment image slice exhibits through-plane distortion which corresponds to the through-plane distortion of the MR image slice. The pre-treatment slice may however not exhibit in-plane distortion, since an in-plane distortion correction (such as a correction as described above) may have already been applied to the 3D image from which the pre-treatment slice is obtained.

In some embodiments as described above, obtaining the pre-treatment slice comprises extracting the pre-treatment slice from the 3D pre-treatment image.

In some embodiments, the extraction is performed by calculating a through-plane distortion vector field using the methods described herein. As described above, the distortion vector field is calculated based on the location of the corresponding MR image slice (i.e. the coordinates of the MR image slice acquired at step 1210) and the magnetic fields used to generate the MR image slice. The through-plane distortion vector field represents the magnitude of the through-plane distortion at each point in the MR image slice. The pre-treatment image slice is then extracted from the 3D pre-treatment volume using the through-plane distortion vector field as described herein, for example by interpolating along the curved slice given at least in part by the distortion vector field.

In other embodiments, the extraction is performed by applying an inverse through-plane distortion correction to the 3D pre-treatment image. The through-plane distortion correction corresponds to the through-plane distortion of the MR image slice. Thus, whilst the original 3D pre-treatment image is fully (3D), or in other words both in-plane and through-plane distortion corrected, by applying the inverse through-plane distortion correction to the 3D pre-treatment image, a 3D pre-treatment image with through-plane distortion is obtained. The pre-treatment image slice is then extracted from the 3D pre-treatment image (with through-plane distortion) based on the location of the MR image slice (as described above).

At step 1230, the MR image slice and the pre-treatment image slice are compared. The comparison may comprise visualising (i.e. displaying on a computer display) an overlay of the pre-treatment slice, or features extracted from the pre-treatment slice (such as contours outlining features of interest), on the MR image slice. Such a visualisation is described with reference to FIG. 8. Additionally or alternatively, in some embodiments the comparison comprises determining an anatomical monitoring position, for example using the techniques described herein. The anatomical position monitoring signal can be used to control a radiation source of a radiotherapy apparatus. For example, the anatomical position monitoring signal may be a beam gating control signal configured to gate a radiotherapy beam generated by a radiation source.

Other Implementations

Figure 13:
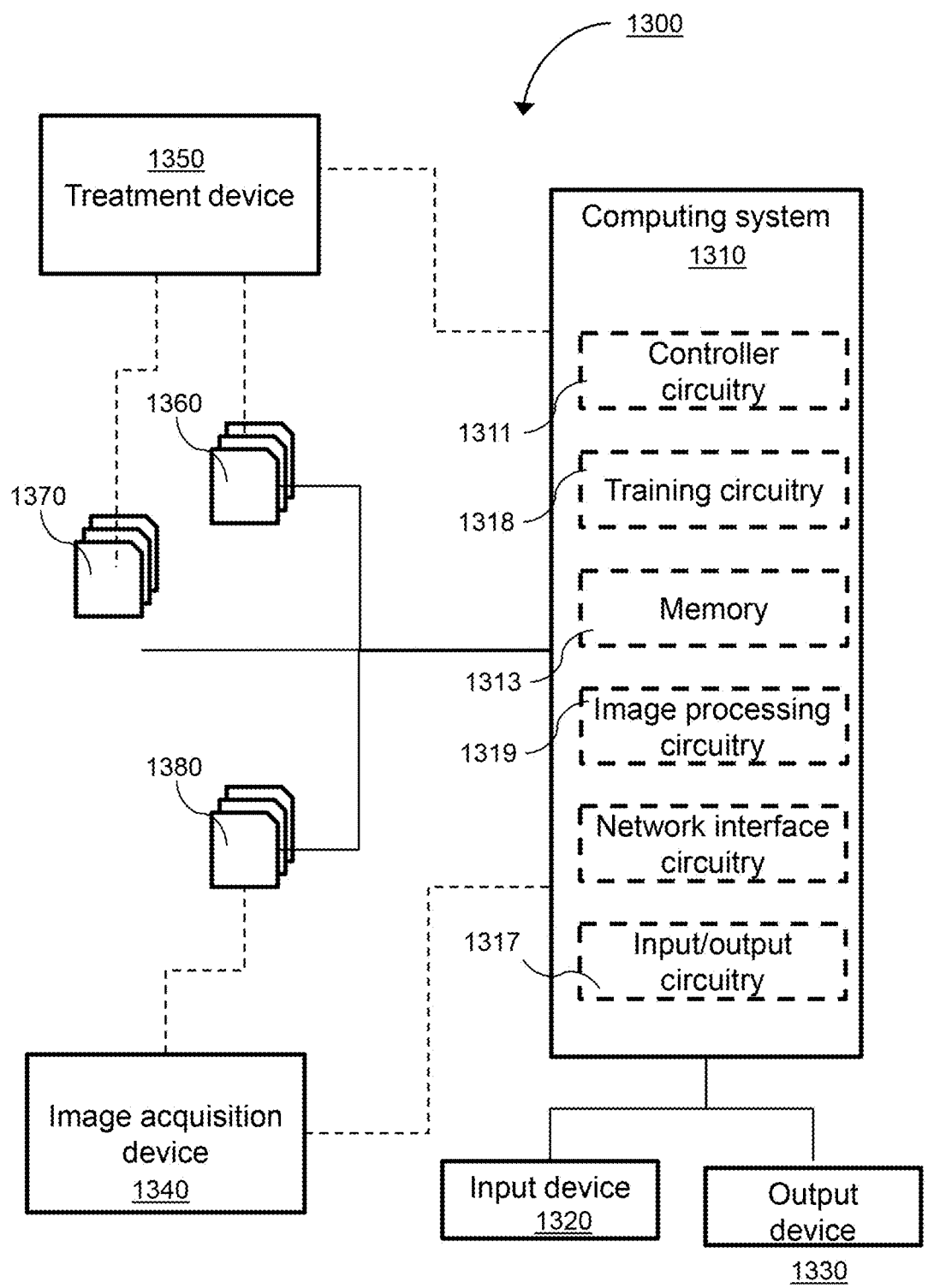
FIG. 13 depicts a system according to the present disclosure.

FIG. 13 illustrates a block diagram of one implementation of a radiotherapy system 1300. The radiotherapy system 1300 comprises a computing system 1310 within which a set of instructions, for causing the computing system 1310 to perform any one or more of the methods discussed herein, may be executed.

The computing system 1310 shall be taken to include any number or collection of machines, e.g. computing device(s), that individually or jointly execute a set (or multiple sets) of instructions to perform any one or more of the methods discussed herein. That is, hardware and/or software may be provided in a single computing device, or distributed across a plurality of computing devices in the computing system. In some implementations, one or more elements of the computing system may be connected (e.g., networked) to other machines, for example in a Local Area Network (LAN), an intranet, an extranet, or the Internet. One or more elements of the computing system may operate in the capacity of a server or a client machine in a client-server network environment, or as a peer machine in a peer-to-peer (or distributed) network environment. One or more elements of the computing system may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

The computing system 1310 includes controller circuitry 1311 and a memory 1313 (e.g., read-only memory (ROM), flash memory, dynamic random access memory (DRAM) such as synchronous DRAM (SDRAM) or Rambus DRAM (RDRAM), etc.). The memory 1313 may comprise a static memory (e.g., flash memory, static random access memory (SRAM), etc.), and/or a secondary memory (e.g., a data storage device), which communicate with each other via a bus (not shown).

Controller circuitry 1311 represents one or more general-purpose processors such as a microprocessor, central processing unit, accelerated processing units, or the like. More particularly, the controller circuitry 1311 may comprise a complex instruction set computing (CISC) microprocessor, reduced instruction set computing (RISC) microprocessor, very long instruction word (VLIW) microprocessor, processor implementing other instruction sets, or processors implementing a combination of instruction sets. Controller circuitry 1311 may also include one or more special-purpose processing devices such as an application specific integrated circuit (ASIC), a field programmable gate array (FPGA), a digital signal processor (DSP), network processor, or the like. One or more processors of the controller circuitry may have a multicore design. Controller circuitry 1311 is configured to execute the processing logic for performing the operations and steps discussed herein.

The computing system 1310 may further include a network interface circuitry 1318. The computing system 1310 may be communicatively coupled to an input device 1320 and/or an output device 1330, via input/output circuitry 1317. In some implementations, the input device 1320 and/or the output device 1330 may be elements of the computing system 1310. The input device 1320 may include an alphanumeric input device (e.g., a keyboard or touchscreen), a cursor control device (e.g., a mouse or touchscreen), an audio device such as a microphone, and/or a haptic input device. The output device 1330 may include an audio device such as a speaker, a video display unit (e.g., a liquid crystal display (LCD) or a cathode ray tube (CRT)), and/or a haptic output device. In some implementations, the input device 1320 and the output device 1330 may be provided as a single device, or as separate devices.

In some implementations, the computing system 1310 may comprise image processing circuitry 1319. Image processing circuitry 1319 may be configured to process image data 1380 (e.g. images, or imaging data), such as medical images obtained from one or more imaging data sources, a treatment device 1350 and/or an image acquisition device 1340. Image processing circuitry 1319 may be configured to process, or pre-process, image data. For example, image processing circuitry 1319 may convert received image data into a particular format, size, resolution or the like. In some implementations, image processing circuitry 1319 may be combined with controller circuitry 1311.

In some implementations, the radiotherapy system 1300 may further comprise an image acquisition device 1340 and/or a treatment device 1350, such as those disclosed herein in the examples of FIGS. 1 and 2. The image acquisition device 1340 and the treatment device 1350 may be provided as a single device. In some implementations, treatment device 1350 is configured to perform imaging, for example in addition to providing treatment and/or during treatment. The treatment device 1350 comprises the main radiation delivery components of the radiotherapy system, such as the RF source, the source of radiation, waveguide and collimator.

Image acquisition device 1340 may be configured to perform positron emission tomography (PET), computed tomography (CT), magnetic resonance imaging (MRI) as described herein.

Image acquisition device 1340 may be configured to output image data 1380, which may be accessed by computing system 1310. Treatment device 1350 may be configured to output treatment data 1360, which may be accessed by computing system 1310.

Computing system 1310 may be configured to access or obtain treatment data 1360, planning data 1370 and/or image data 1380. Treatment data 1360 may be obtained from an internal data source (e.g. from memory 1313) or from an external data source, such as treatment device 1350 or an external database. Planning data 1370 may be obtained from memory 1313 and/or from an external source, such as a planning database. Planning data 1370 may comprise information obtained from one or more of the image acquisition device 1340 and the treatment device 1350.

Figure 14:
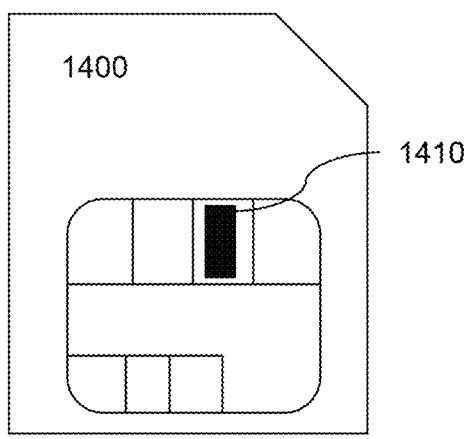
FIG. 14 depicts a computer program product according to the present disclosure.

The various methods described above may be implemented by a computer program. The computer program may include computer code 1410 (e.g. instructions) arranged to instruct a computer to perform the functions of one or more of the various methods described above. The steps of the methods described above may be performed in any suitable order. For example, step 1210 of method 1200 may be performed before, after, simultaneously or substantially simultaneously with step 1220. The computer program and/or the code 1410 for performing such methods may be provided to an apparatus, such as a computer, on one or more computer readable media 1400 or, more generally, a computer program product, depicted in FIG. 14. The computer readable media 1400 may be transitory or non-transitory. The one or more computer readable media 1400 could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD. The code 1410 may also reside, completely or at least partially, within the memory 1313 and/or within the controller circuitry 1311 during execution thereof by the computing system 1310, the memory 1313 and the controller circuitry 1311 also constituting computer-readable storage media.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may comprise a special-purpose processor, such as an FPGA or an ASIC. A hardware component may also include programmable logic or circuitry that is temporarily configured by software to perform certain operations.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method for monitoring a position of a subject during a radiotherapy, the computer-implemented method comprising:
    obtaining a magnetic resonance (MR) image slice of a subject, wherein the MR image slice of the subject exhibits a through-plane distortion;
    obtaining a pre-treatment image slice of the subject, wherein the pre-treatment image slice of the subject corresponds to the MR image slice of the subject and exhibits a through-plane distortion that corresponds to the through-plane distortion of the MR image slice of the subject; and
    comparing the MR image slice of the subject with the corresponding pre-treatment image slice of the subject.

2. The computer-implemented method of claim 1, wherein the MR image slice of the subject has an in-plane distortion-correction.

3. The computer-implemented method of claim 1, further comprising:
    applying an in-plane distortion correction to the MR image slice of the subject.

4. The computer-implemented method of claim 1, wherein the pre-treatment image slice of the subject has an in-plane distortion correction.

5. The computer-implemented method of claim 1, wherein the pre-treatment image slice of the subject is extracted from a three-dimensional (3D) pre-treatment image that is 3D distortion corrected, and wherein obtaining the pre-treatment image slice of the subject exhibiting the through-plane distortion comprises:
    calculating, based on a location of the MR image slice of the subject and one or more magnetic fields used to generate the MR image slice of the subject, a through-plane distortion vector field, wherein the through-plane distortion vector field represents a magnitude of the through-plane distortion at each point in the MR image slice of the subject; and
    extracting, from the 3D pre-treatment image, the pre-treatment image slice of the subject using the through-plane distortion vector field.

6. The computer-implemented method of claim 1, wherein the pre-treatment image slice of the subject is extracted from a three-dimensional (3D) pre-treatment image that is 3D distortion corrected, and wherein obtaining the pre-treatment image slice of the subject exhibiting the through-plane distortion comprises:
    applying an inverse through-plane distortion correction to the 3D pre-treatment image to obtain a 3D pre-treatment image that is in-plane distortion corrected and exhibits the through-plane distortion; and
    extracting, from the 3D pre-treatment image exhibiting the through-plane distortion, the pre-treatment image slice of the subject.

7. The computer-implemented method of claim 1, further comprising:
    extracting, from the pre-treatment image slice of the subject, one or more contour details indicating one or more substructures of the subject; and
    displaying, on a display, the MR image slice of the subject and the one or more contour details extracted from the corresponding pre-treatment image slice of the subject superimposed over the MR image slice of the subject.

8. The computer-implemented method of claim 1, further comprising:
    updating a radiotherapy treatment plan based on a comparison between the MR image slice of the subject and the pre-treatment image slice of the subject.

9. The computer-implemented method of claim 1, wherein comparing the MR image slice of the subject with the pre-treatment image slice of the subject comprises generating an anatomical position monitoring signal based on a geometrical transformation between the MR image slice of the subject and the pre-treatment image slice of the subject.

10. The computer-implemented method of claim 9, further comprising:
    controlling a radiation source of a radiotherapy apparatus based on the anatomical position monitoring signal.

11. The computer-implemented method of claim 10, wherein the anatomical position monitoring signal is a beam gating control signal configured to gate a radiotherapy beam generated by the radiation source.

12. A non-transitory computer readable medium storing instructions that, when executed by one or more processors, cause the one or more processors to:
    obtain a magnetic resonance (MR) image slice of a subject, wherein the MR image slice of the subject exhibits a through-plane distortion;
    obtain a pre-treatment image slice of the subject, wherein the pre-treatment image slice of the subject corresponds to the MR image slice of the subject and exhibits a through-plane distortion that corresponds to the through-plane distortion of the MR image slice of the subject; and
    compare the MR image slice of the subject with the corresponding pre-treatment image slice of the subject.

13. The non-transitory computer readable medium of claim 12, wherein the instructions further cause the one or more processor to:
    apply an in-plane distortion correction to the MR image slice of the subject.

14. The non-transitory computer readable medium of claim 12, wherein the pre-treatment image slice of the subject is extracted from a three-dimensional (3D) pre-treatment image that is 3D distortion corrected, and wherein obtaining the pre-treatment image slice of the subject exhibiting the through-plane distortion comprises:

calculating, based on a location of the MR image slice of the subject and one or more magnetic fields used to generate the MR image slice of the subject, a through-plane distortion vector field, wherein the through-plane distortion vector field represents a magnitude of the through-plane distortion at each point in the MR image slice of the subject; and extracting, from the 3D pre-treatment image, the pre-treatment image slice of the subject using the through-plane distortion vector field.

15. A radiotherapy device comprising:

a radiation source configured to generate a radiotherapy beam for irradiating a subject;

a magnetic resonance (MR) imaging apparatus configured to generate one or more MR image slices of the subject; and a controller communicatively coupled to the radiation source and the MR imaging apparatus, wherein the controller is configured to:

obtain, using the MR imaging apparatus, an MR image slice of the subject, wherein the MR image slice of the subject exhibits a through-plane distortion;

obtain a pre-treatment image slice of the subject, wherein the pre-treatment image slice of the subject corresponds to the MR image slice of the subject and exhibits a through-plane distortion that corresponds to the through-plane distortion of the MR image slice of the subject; and compare the MR image slice of the subject with the corresponding pre-treatment image slice of the subject.

16. The radiotherapy device of claim 15, wherein the controller is further configured to:

apply an in-plane distortion correction to the MR image slice of the subject.

17. The radiotherapy device of claim 15, wherein the pre-treatment image slice of the subject is extracted from a three-dimensional (3D) pre-treatment image that is 3D distortion corrected, and wherein the controller is configured to obtain the pre-treatment image slice of the subject by:

calculating, based on a location of the MR image slice of the subject and one or more magnetic fields used to generate the MR image slice of the subject, a through-plane distortion vector field, wherein the through-plane distortion vector field represents a magnitude of the through-plane distortion at each point in the MR image slice of the subject; and extracting, from the 3D pre-treatment image, the pre-treatment image slice of the subject using the through-plane distortion vector field.

18. The radiotherapy device of claim 15, wherein pre-treatment image slice of the subject is extracted from a three-dimensional (3D) pre-treatment image that is 3D distortion corrected, and wherein the controller is configured to obtain the pre-treatment image slice of the subject by:

applying an inverse through-plane distortion correction to the 3D pre-treatment image to obtain a 3D pre-treatment image that is in-plane distortion corrected and exhibits the through-plane distortion; and extracting, from the 3D pre-treatment image exhibiting the through-plane distortion, the pre-treatment slice of the subject.

19. The radiotherapy device of claim 15, wherein the controller is further configured to:

extracting, from the pre-treatment image slice of the subject, one or more contour details indicating one or more substructures of the subject; and displaying, on a display, the MR image slice of the subject and the one or more contour details extracted from the corresponding pre-treatment image slice of the subject superimposed over the MR image slice of the subject.

20. The radiotherapy device of claim 15, wherein the controller is further configured to:

update a radiotherapy treatment plan based on a comparison between the MR image slice of the subject and the pre-treatment image slice of the subject.

21. The radiotherapy device of claim 15, wherein the controller is configured to compare the MR image slice of the subject with the pre-treatment image slice of the subject by:

generating an anatomical position monitoring signal based on a geometrical transformation between the MR image slice of the subject and the pre-treatment image slice of the subject.

22. The radiotherapy device of claim 15, wherein the controller is further configured to:

control a radiation source based on an anatomical position monitoring signal, wherein the anatomical position monitoring signal is a beam gating control signal configured to gate a radiotherapy beam generated by the radiation source.

* * * * *